United States Patent
Shimada et al.

(10) Patent No.: US 10,650,974 B2
(45) Date of Patent: May 12, 2020

(54) MULTILAYER CERAMIC CAPACITOR

(71) Applicant: Murata Manufacturing Co., Ltd., Nagaokakyo-shi, Kyoto-fu (JP)

(72) Inventors: Kohei Shimada, Nagaokakyo (JP); Akio Masunari, Nagaokakyo (JP); Yuta Saito, Nagaokakyo (JP); Shunsuke Abe, Nagaokakyo (JP); Tomoo Yuguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/916,386

(22) Filed: Mar. 9, 2018

(65) Prior Publication Data

US 2018/0268999 A1  Sep. 20, 2018

(30) Foreign Application Priority Data

Mar. 14, 2017 (JP) .................. 2017-049107
Mar. 14, 2017 (JP) .................. 2017-049109
(Continued)

(51) Int. Cl.
| | |
|---|---|
| H01G 4/30 | (2006.01) |
| H01G 4/005 | (2006.01) |
| H01G 4/008 | (2006.01) |
| H01G 4/12 | (2006.01) |
| H01G 4/232 | (2006.01) |
| H01G 4/012 | (2006.01) |

(52) U.S. Cl.
CPC ............... *H01G 4/30* (2013.01); *H01G 4/008* (2013.01); *H01G 4/012* (2013.01);
(Continued)

(58) Field of Classification Search
CPC ........ H01G 4/005; H01G 4/008; H01G 4/232; H01G 4/30; H01G 4/1227; H01G 4/1245
(Continued)

(56) References Cited

U.S. PATENT DOCUMENTS

2004/0105214 A1* 6/2004 Nakamura ........... H01G 4/1227
                                                          361/321.2
2012/0018204 A1    1/2012 Sato et al.
(Continued)

FOREIGN PATENT DOCUMENTS

| JP | 2008-085041 A | 4/2008 |
|---|---|---|
| JP | 2011-057511 A | 3/2011 |

(Continued)

OTHER PUBLICATIONS

Official Communication issued in corresponding Japanese Patent Application No. 2017-233531, dated Feb. 12, 2020.

*Primary Examiner* — Eric W Thomas
*Assistant Examiner* — Arun Ramaswamy
(74) *Attorney, Agent, or Firm* — Keating & Bennett, LLP

(57) ABSTRACT

A multilayer ceramic capacitor includes a laminate with a rectangular or substantially rectangular parallelepiped shape and including dielectric layers, first internal electrode layers, and second internal electrode layers that are laminated; a first external electrode connected with the first internal electrode layers; and a second external electrode connected with the second internal electrode layers. Each of the first internal electrode layers or the second internal electrode layers has a coverage in a central portion in a W direction that is lower than a coverage within about 30.000 μm from an end portion in the W direction, and has a shifting amount in the W direction of about 0.000 μm or more and about 10.000 μm or less.

19 Claims, 9 Drawing Sheets

(30) Foreign Application Priority Data

| Mar. 14, 2017 | (JP) | 2017-049112 |
|---|---|---|
| Mar. 14, 2017 | (JP) | 2017-049114 |
| Dec. 5, 2017 | (JP) | 2017-233531 |

(52) U.S. Cl.
CPC ......... *H01G 4/1227* (2013.01); *H01G 4/1245* (2013.01); *H01G 4/232* (2013.01)

(58) Field of Classification Search
USPC ......... 361/321.2, 306.3, 301.4, 321.3, 306.1, 361/303
See application file for complete search history.

(56) References Cited

U.S. PATENT DOCUMENTS

| 2012/0250221 A1 | 10/2012 | Yamashita | |
|---|---|---|---|
| 2013/0094118 A1* | 4/2013 | Kim | H01G 4/30 361/301.4 |
| 2014/0125194 A1* | 5/2014 | Lee | H01L 41/0472 310/311 |
| 2015/0155098 A1 | 6/2015 | Yamaguchi et al. | |
| 2015/0170838 A1* | 6/2015 | Suzuki | H01G 4/30 361/301.4 |
| 2015/0364259 A1 | 12/2015 | Kanzaki et al. | |

FOREIGN PATENT DOCUMENTS

| JP | 2012-028457 A | 2/2012 |
|---|---|---|
| JP | 2014-096551 A | 5/2014 |
| JP | 2016-015465 A | 1/2016 |
| KR | 10-2012-0080657 A | 7/2012 |
| KR | 10-2014-0058841 A | 5/2014 |
| KR | 10-2015-0036391 A | 4/2015 |
| WO | 2014/024538 A1 | 2/2014 |

* cited by examiner

MULTILAYER CERAMIC CAPACITOR

CROSS REFERENCE TO RELATED APPLICATIONS

This application claims the benefit of priority to Japanese Patent Application No. 2017-233531 filed on Dec. 5, 2017, Japanese Patent Application No. 2017-049114 filed on Mar. 14, 2017, Japanese Patent Application No. 2017-049112 filed on Mar. 14, 2017, Japanese Patent Application No. 2017-049109 filed on Mar. 14, 2017 and Japanese Patent Application No. 2017-049107 filed on Mar. 14, 2017. The entire contents of these applications are hereby incorporated herein by reference.

BACKGROUND OF THE INVENTION

1. Field of the Invention

The present invention relates to a multilayer ceramic capacitor.

2. Description of the Related Art

Miniaturization of electronic devices has advanced further. In association with this, further miniaturization is desired for multilayer ceramic capacitors that are installed in electronic devices. A basic structure of a multilayer ceramic capacitor is disclosed, for example, in Japanese Patent Application Laid-Open No. 2011-57511. The multilayer ceramic capacitor in Japanese Patent Application Laid-Open No. 2011-57511 includes a capacitor element body structured by alternately laminating a dielectric layer and an internal electrode layer. Internal electrode layers are laminated in such a manner that respective end surfaces are alternately exposed to surfaces of opposing two end portions of the capacitor element body. A pair of external electrodes are formed on each end portion of the capacitor element body, and connected with exposed end surfaces of internal electrode layers that are disposed alternately, to form a capacitor circuit.

For multilayer ceramic capacitors, miniaturization as described above is required, and at the same time, higher capacitance is demanded. In response to this, maximization of internal electrode layers is being developed. Maximization of internal electrode layers reduces the distance between the internal electrode layers and the outside. This has caused a problem of deterioration in moisture proof reliability of the multilayer ceramic capacitor. Also, a problem has arisen that an initial short circuit defect occurs depending on the shifting amount in the width direction between internal electrode layers.

SUMMARY OF THE INVENTION

Preferred embodiments of the present invention provide multilayer ceramic capacitors in which moisture proof reliability in an actual use environment is improved, and initial short circuit defects are reduced or prevented by reducing the entry route of water.

A ceramic capacitor according to a preferred embodiment of the present invention includes a laminate having a rectangular or substantially rectangular parallelepiped shape and including a plurality of dielectric layers that are alternately laminated, a plurality of first internal electrode layers, a plurality of second internal electrode layers, the laminate including a first principal surface and a second principal surface that are opposite to each other in a laminating direction, a first lateral surface and a second lateral surface that are opposite to each other in a width direction that is perpendicular or substantially perpendicular to the laminating direction, and a first end surface and a second end surface that are opposite to each other in a length direction that is perpendicular or substantially perpendicular to the laminating direction and the width direction; a first external electrode that is electrically connected with the plurality of first internal electrode layers and provided on the first end surface; and a second external electrode that is electrically connected with the plurality of second internal electrode layers provided on the second end surface, and each of the first internal electrode layers and the second internal electrode layers has a coverage in a central portion in the width direction that is lower than a coverage within about 30.000 μm from an end portion in the width direction, and a shifting amount in the width direction of about 0.000 μm or more and about 10.000 μm or less.

Preferably, in the first internal electrode layer, a coverage within about 30.000 μm from an end portion in the length direction of the side that is not connected with the first external electrode is lower than a coverage within about 30.000 μm from an end portion in the width direction, and in the second internal electrode layer, a coverage within about 30.000 μm from an end portion in the length direction of the side that is not connected with the second external electrode is lower than a coverage within about 30.000 μm from an end portion in the width direction.

Preferably, each of the plurality of first internal electrode layers and the plurality of second internal electrode layers includes Ni, a Ni—Sn reaction layer is provided at a boundary between the first internal electrode layer and the second internal electrode layer, and the dielectric layer, and the Ni—Sn reaction layer is continuously provided linearly in a length of about 50.0% or more and about 100.0% or less of a width dimension of each of the first internal electrode layer and the second internal electrode layer, and has a thickness of about 5 nm or more and about 20 nm or less.

Preferably, Mg segregates in a portion adjacent to the dielectric layer of each of the plurality of first internal electrode layers and the plurality of second internal electrode layers.

Preferably, a Mg segregation amount of each of the first internal electrode layer or the second internal electrode layer located closest to an outer layer side is about 0.05 or less by elemental ratio Mg/Ni.

Preferably, Ni—Mg—Mn—O glass segregates in an end portion in the width direction of each of the first internal electrode layer and the second internal electrode layer.

Preferably, a dimension along the width direction of a region in which the Ni—Mg—Mn—O glass segregates is about 1.000 μm or less.

Preferably, the first external electrode includes a baked layer extending to a portion of each of the first principal surface and the second principal surface from the first end surface, and the second external electrode includes a baked layer extending to a portion of each of the first principal surface and the second principal surface from the second end surface, each of the baked layer of the first external electrode and the baked layer of the second external electrode includes a protruding portion that protrudes in the laminating direction at least in a portion provided on the second principal surface side, regarding the portion provided on the second principal surface side of the baked layer of the first external electrode, when a first line connecting a leading end of the second end surface side and an apex of the protruding portion is defined, a dimension along the laminating direction between a point on the surface of the portion provided on the second principal surface side at which a perpendicular or substantially perpendicular line drawn from the first line to the surface of the portion provided on the second principal surface side to cross the first line at right angles is the longest, and the apex of the protruding portion is about 0.5 µm or more and about 35 µm or less, regarding the portion provided on the second principal surface side of the baked layer of the second external electrode, when a second line connecting a leading end of the first end surface side and the apex of the protruding portion is defined, a dimension along the laminating direction between the point on the surface of the portion provided on the second principal surface side at which a perpendicular or substantially perpendicular line drawn from the second line to the surface of the portion provided on the second principal surface side to cross the second line at right angles is the longest, and the apex of the protruding portion is about 0.5 µm or more and about 35 µm or less, and dimension along the laminating direction of the multilayer ceramic capacitor is about 0.18 mm or more and about 0.70 mm or less.

Preferably, regarding a surface of a portion provided on the second principal surface side of the baked layer of the first external electrode, denoting a dimension along the surface of the first external electrode from a leading end of the second end surface side to the first end surface as $d_1$, and a dimension along the length direction from the leading end of the second end surface side to the first end surface as $e_1$, $d_1/e_1$ is about 1.0045 or more and about 1.4 or less, and regarding a surface of a portion provided on the second principal surface side of the baked layer of the second external electrode, denoting a dimension along the surface of the second external electrode from a leading end of the first end surface side to the second end surface as $d_2$, and a dimension along the length direction from the leading end of the first end surface side to the second end surface as $e_2$, $d_2/e_2$ is about 1.0045 or more and about 1.4 or less.

Preferably, a dimension in the laminating direction is about 0.300 mm±about 0.090 mm, a dimension in the width direction is about 0.300 mm±about 0.090 mm, a dimension in the length direction is about 0.600 mm±about 0.090 mm, each of the plurality of dielectric layers has a thickness of about 0.48 µm±about 0.10 µm, and a number of the plurality of dielectric layers is about 100 or more and about 500 or less.

Preferably, a dimension in the laminating direction is about 0.200 mm±about 0.050 mm, a dimension in the width direction is about 0.200 mm±about 0.050 mm, a dimension in the length direction is about 0.400 mm±about 0.050 mm, each of the plurality of dielectric layers has a thickness is about 0.48 µm±about 0.10 µm, and a number of the plurality of dielectric layers is about 50 or more and about 300 or less.

Preferably, a dimension in the laminating direction is about 0.300 mm±about 0.050 mm, a dimension in the width direction is about 0.200 mm±about 0.050 mm, a dimension in the length direction is about 0.400 mm±about 0.050 mm, each of the plurality of dielectric layers has a thickness is about 0.48 µm±about 0.10 µm, and a number of the plurality of dielectric layers is about 100 or more and about 500 or less.

Preferably, a dimension in the laminating direction is about 0.300 mm±about 0.050 mm, a dimension in the width direction is about 0.300 mm±about 0.050 mm, a dimension in the length direction is about 0.400 mm±about 0.050 mm, each of the plurality of dielectric layers has a thickness is about 0.48 µm±about 0.10 µm, and a number of the plurality of dielectric layers is about 100 or more and about 500 or less.

Preferably, a dimension in the laminating direction is about 0.250 mm±about 0.025 mm, a dimension in the width direction is about 0.250 mm±about 0.025 mm, a dimension in the length direction is about 0.500 mm±about 0.025 mm, each of the plurality of dielectric layers has a thickness is about 0.48 µm±about 0.10 µm, and a number of the plurality of dielectric layers is about 100 or more and about 500 or less.

Preferably, a dimension in the laminating direction is about 0.500 mm±about 0.050 mm, a dimension in the width direction is about 0.500 mm±about 0.050 mm, a dimension in the length direction is about 0.800 mm±about 0.050 mm, each of the plurality of dielectric layers has a thickness is about 0.48 µm±about 0.10 µm, and a number of the plurality of dielectric layers is about 200 or more and about 1000 or less.

Preferably, a dimension in the laminating direction is about 0.600 mm±about 0.050 mm, a dimension in the width direction is about 0.450 mm±about 0.050 mm, a dimension in the length direction is about 0.750 mm±about 0.050 mm, each of the plurality of dielectric layer has a thickness is about 0.48 µm±about 0.10 µm, and a number of the plurality of dielectric layers is about 200 or more and about 1000 or less.

Preferably, a dimension in the laminating direction is about 0.500 mm±about 0.200 mm, a dimension in the width direction is about 0.500 mm±about 0.200 mm, a dimension in the length direction is about 1.000 mm±about 0.200 mm, each of the plurality of dielectric layer has a thickness is about 0.48 µm±about 0.10 µm, and a number of the plurality of dielectric layers is about 200 or more and about 1000 or less.

According to preferred embodiments of the present invention, it is possible to provide multilayer ceramic capacitors in which moisture proof reliability in an actual use environment is improved, and initial short circuit defects are reduced or prevented by reducing the entry route of water.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
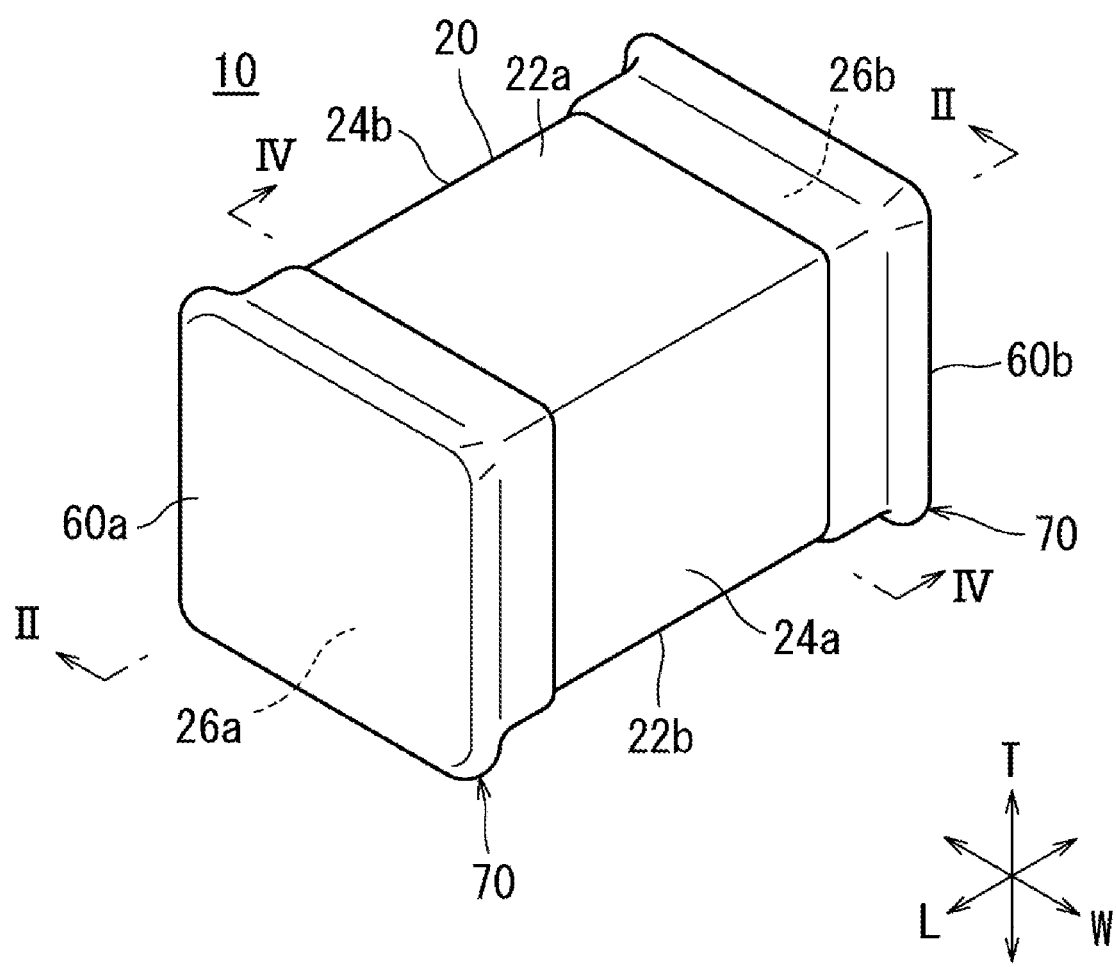
FIG. 1 is an external perspective view of a multilayer ceramic capacitor according to a preferred embodiment of the present invention.
Figure 2:
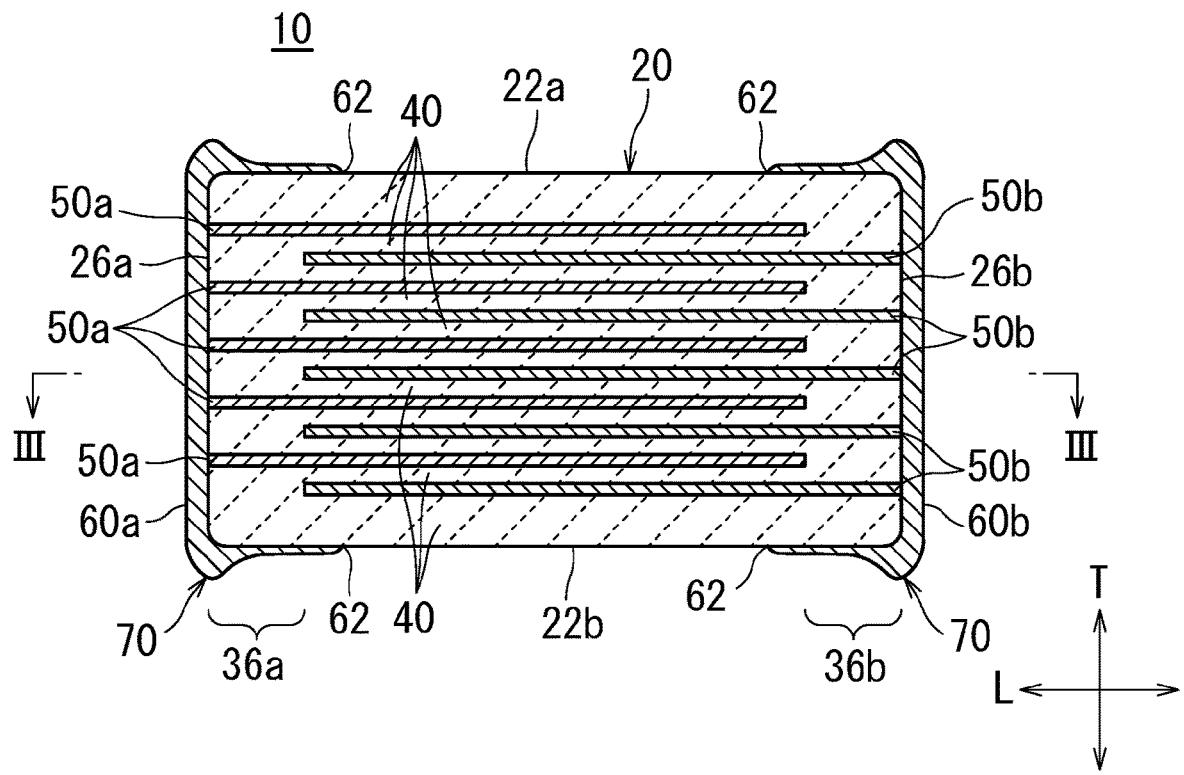
FIG. 2 is a section view along a length direction of a multilayer ceramic capacitor according to a preferred embodiment of the present invention.
Figure 3:
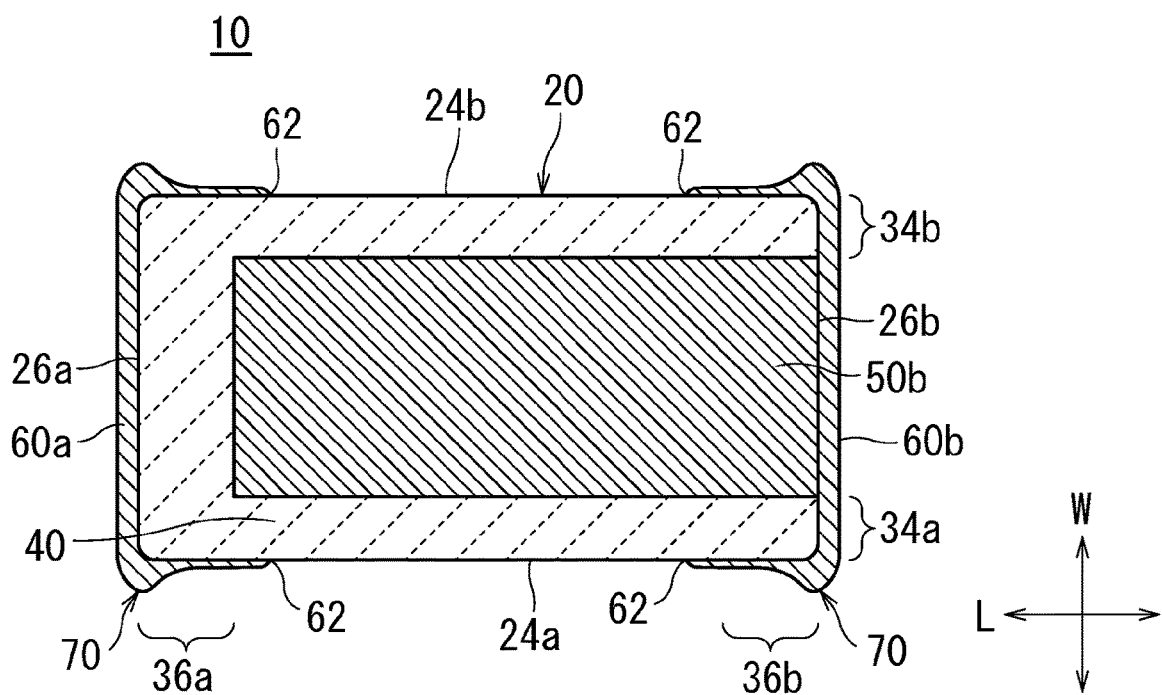
FIG. 3 is a section view along a plane in which a width direction and the length direction intersect in a central portion in a laminating direction of a multilayer ceramic capacitor according to a preferred embodiment of the present invention.
Figure 4:
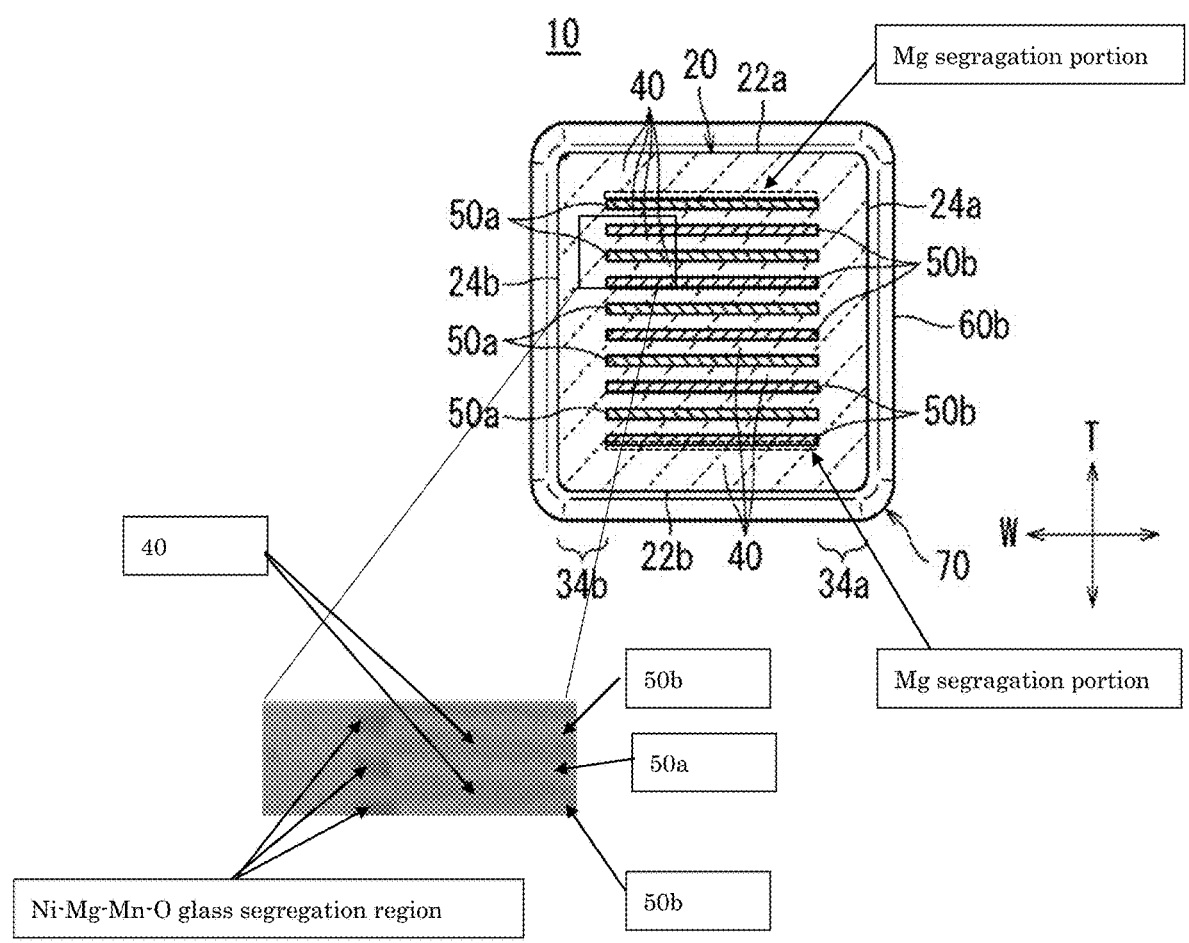
FIG. 4 is a section view along the width direction of a multilayer ceramic capacitor according to a preferred embodiment of the present invention.
Figure 5A:
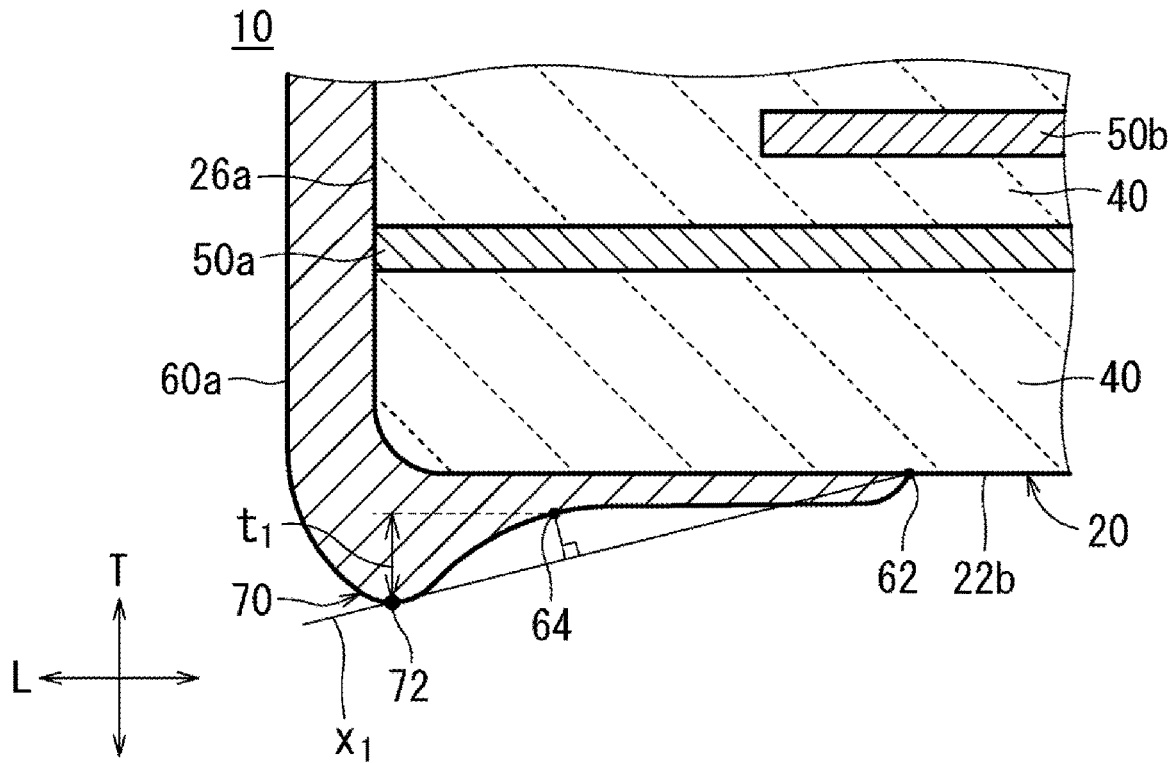
FIG. 5A is an enlarged section view for illustrating $t_1$ of a first external electrode according to a preferred embodiment of the present invention.
Figure 5B:
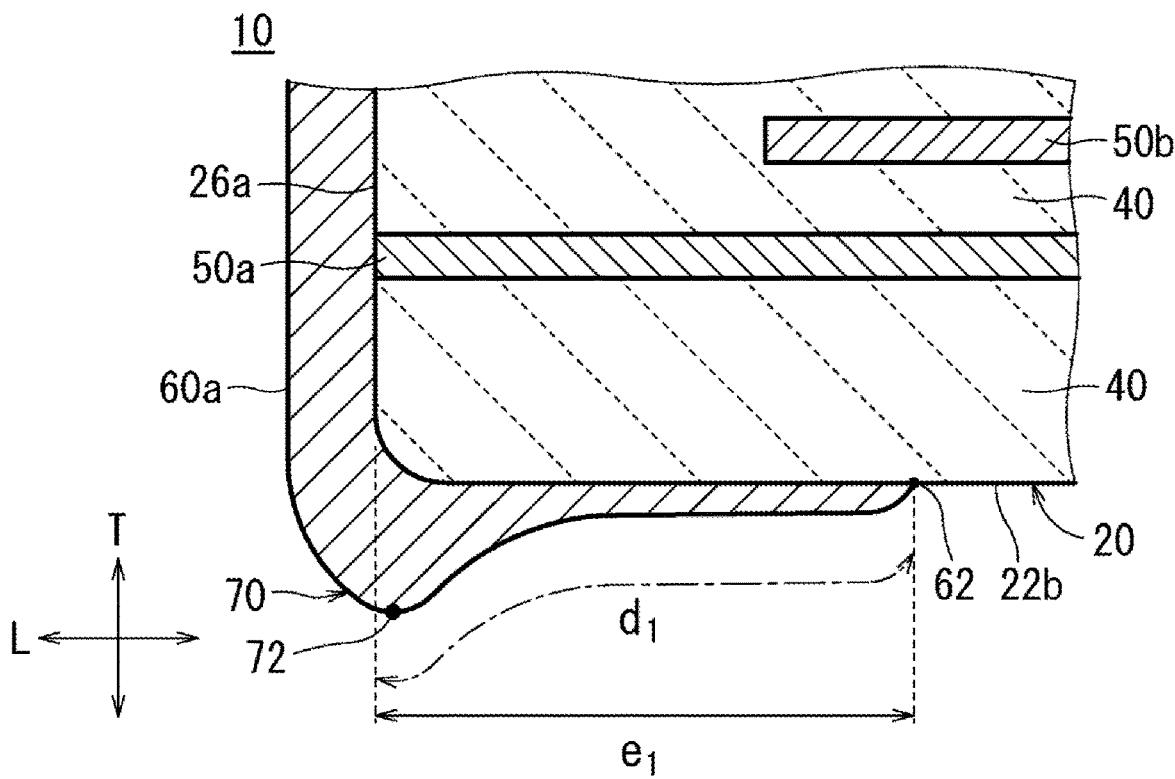
FIG. 5B is an enlarged section view for illustrating $d_1/e_1$ of the first external electrode according to a preferred embodiment of the present invention.

Hereinafter, a multilayer ceramic capacitor according to a preferred embodiment of the present invention will be described by referring to FIG. 1 to FIGS. 5A and 5B. FIG. 1 is an external perspective view of a multilayer ceramic capacitor according to a preferred embodiment of the present invention. FIG. 2 is a section view along a length direction of a multilayer ceramic capacitor according to a preferred embodiment of the present invention. FIG. 3 is a section view along a plane in which a width direction and the length direction intersect in a central portion in a laminating direction of a multilayer ceramic capacitor according to a preferred embodiment of the present invention. FIG. 4 is a section view along the width direction of a multilayer ceramic capacitor according to a preferred embodiment of the present invention. FIG. 5A is an enlarged section view for illustrating $t_1$ of a first external electrode according to a preferred embodiment of the present invention. FIG. 5B is an enlarged section view for illustrating $d_1/e_1$ of the first external electrode according to a preferred embodiment of the present invention.

A multilayer ceramic capacitor 10 according to the present preferred embodiment includes a laminate 20 having a rectangular or substantially rectangular parallelepiped shape, and a first external electrode 60a and a second external electrode 60b provided on surfaces of the laminate 20. Preferably, a dimension along a T direction (later-described T dimension) of the multilayer ceramic capacitor 10 is about 0.18 mm or more and about 0.70 mm or less, for example.

The laminate 20 is formed into a rectangular or substantially rectangular parallelepiped by alternately laminating each of a plurality of dielectric layers 40, and each of a plurality of first internal electrode layers 50a, and each of a plurality of second internal electrode layers 50b. The laminate 20 includes a first principal surface 22a and a second principal surface 22b that are opposite to each other in the laminating direction (T direction shown in FIG. 1), a first lateral surface 24a and a second lateral surface 24b that are opposite to each other in a width direction that is perpendicular or substantially perpendicular to T direction (W direction shown in FIG. 1 or the like), and a first end surface 26a and a second end surface 26b that are opposite to each other in a length direction that is perpendicular or substantially perpendicular to T direction and W direction (L direction shown in FIG. 1 or the like). Preferably, a corner portion and a ridge portion of the laminate 20 are rounded. Here, a corner portion of the laminate 20 means a portion in which three surfaces of the principal surfaces, the lateral surfaces and the end surfaces of the laminate 20 intersect. A ridge portion of the laminate 20 means a portion in which two surfaces of the principal surfaces and the lateral surfaces of the laminate 20 intersect.

The dielectric layer 40 is laminated while it is sandwiched between the first internal electrode layer 50a and the second internal electrode layer 50b. The thickness of one layer of the dielectric layer 40 is preferably about 0.2 μm or more and about 1.0 μm or less, and more preferably about 0.4 μm or more and about 0.8 μm or less, for example. The dielectric layer 40 includes Ba, Ti, Dy, Mn, Si, V, Al, Zr and Ca, for example.

Preferably, the dielectric layer 40 includes about 0.2 parts by mol or more and about 0.5 parts by mol or less of Dy, for example, relative to 100 parts by mol of Ti. If Dy is less than about 0.2 parts by mol or more than about 0.5 parts by mol, relative to 100 parts by mol of Ti, the moisture proof reliability of the multilayer ceramic capacitor 10 is insufficient. The moisture proof reliability in this context may be determined according to whether deterioration in a resistance (deterioration that a resistance rapidly drops relative to the initial value) occurs when a voltage corresponding to twice the rated voltage is applied to the multilayer ceramic capacitor 10 for about 12 hours in the environment at a temperature of about 85° C., and a humidity of about 85%. Specifically, when the resistance drops to about 1/10 or less of the initial value, or when the multilayer ceramic capacitor does not work, it is determined that the moisture proof reliability is insufficient.

Preferably, the dielectric layer 40 includes about 0.288 parts by mol or more and about 0.35 parts by mol or less of V, for example, relative to 100 parts by mol of Ti. If V is less than about 0.288 parts by mol or more than about 0.35 parts by mol, relative to 100 parts by mol of Ti, the temperature characteristic of the multilayer ceramic capacitor 10 is not acceptable. The temperature characteristic was determined according to whether X5R is satisfied.

Preferably, the dielectric layer 40 includes about 0.04 parts by mol or less of Zr, for example, relative to 100 parts by mol of Ti.

The parts by mol of each element may be determined by conducting ICP analysis for the laminate 20 that is dissolved by using a solvent. Therefore, it does not depend on where in the laminate 20 the element exists. That is, as a structure of the multilayer ceramic capacitor 10 according to a preferred embodiment of the present invention, one in which the composition of the laminate 20 is defined as the same or substantially the same as the composition of the dielectric layer 40 may be provided. As another structure of the multilayer ceramic capacitor 10 according to a preferred embodiment of the present invention, one in which the parts by mol of each element is defined as the same or substantially the same as the parts by mol of each element included in the aforementioned dielectric layer 40, as the parts by mol when the laminate 20 is dissolved using a solvent may be provided. As a method for dissolving the laminate 20, for example, an alkali fusion method may be used.

Each of the plurality of dielectric layers 40 includes an outer layer portion located on the first principal surface 22a side, an outer layer portion located on the second principal surface 22b side, and an inner layer portion located in the region sandwiched by these outer layer portions in the T direction. Specifically, the outer layer portion located on the first principal surface 22a side means the dielectric layer 40 located between the first principal surface 22a and the internal electrode layer closest to the first principal surface 22a (the first internal electrode layer 50a or the second internal electrode layer 50b), the outer layer portion located on the second principal surface 22b side means the dielectric layer 40 located between the second principal surface 22b and the internal electrode layer closest to the second principal surface 22b, and the inner layer portion means the dielectric layers 40 located between the internal electrode layer closest to the first principal surface 22a and the internal electrode layer closest to the second principal surface 22b. The thickness along the T direction of each of the outer layer portions of the first principal surface 22a side and the second principal surface 22b side is preferably about 10 μm or more, for example.

The first internal electrode layer 50a extends planarly at the boundary of the dielectric layer 40, and includes an end portion exposed to the first end surface 26a of the laminate 20. The second internal electrode layer 50b extends planarly at the boundary of the dielectric layer 40 so that it is opposed to the first internal electrode layer 50a with the dielectric layer 40 interposed therebetween, and includes an end portion exposed to the second end surface 26b of the laminate 20. Therefore, the first internal electrode layer 50a includes an opposed electrode portion opposed to the second internal electrode layer 50b with the dielectric layer 40 interposed therebetween, an extended electrode portion extending from an end portion of the first end surface 26a side of the opposed electrode portion to the first end surface 26a, and an exposed portion exposed from the first end surface 26a. Similarly, the second internal electrode layer 50b includes an opposed electrode portion opposed to the first internal electrode layer 50a with the dielectric layer 40 interposed therebetween, an extended electrode portion extending from an end portion of the second end surface 26b side of the opposed electrode portion to the second end surface 26b, and an exposed portion exposed from the second end surface 26b. The opposed electrode portion of the first internal electrode layer 50a and the opposed electrode portion of the second internal electrode layer 50b are opposed to each other with the dielectric layer 40 interposed therebetween, and thus a capacitance is generated. As a result, the multilayer ceramic capacitor 10 according to the present preferred embodiment defines and functions as a capacitor.

Here, a W gap and an L gap of the laminate 20 are described. The laminate 20 includes a first lateral portion 34a (W gap) located between respective opposed electrode portions of the first internal electrode layer 50a and the second internal electrode layer 50b and the first lateral surface 24a, and a second lateral portion 34b (W gap) located between respective opposed electrode portions of the first internal electrode layer 50a and the second internal electrode layer 50b and the second lateral surface 24b. The dimension along the W direction of each of the first lateral portion 34a and the second lateral portion 34b is preferably about 10 μm or more and about 40 μm or less, for example. The laminate 20 includes a first end portion 36a located between respective opposed electrode portions of the first internal electrode layer 50a and the second internal electrode layer 50b and the first end surface 26a (L gap), and a second end portion 36b located between respective opposed electrode portions of the first internal electrode layer 50a and the second internal electrode layer 50b and the second end surface 26b (L gap). The dimension along the L direction of each of the first end portion 36a and the second end portion 36b is preferably about 30 μm or more and about 50 μm or less, for example.

The first internal electrode layer 50a and the second internal electrode layer 50b preferably include, for example, metal such as Ni, Sn, Cu, Ag, Pd, Ag—Pd alloy, and Au. The first internal electrode layer 50a and the second internal electrode layer 50b may further include dielectric grains having the same or substantially the same composition system as the ceramics included in the dielectric layer 40. The thickness per one layer of the first internal electrode layer 50a and the second internal electrode layer 50b is preferably about 0.3 μm or more and about 0.7 μm or less, for example. Each of the first internal electrode layer 50a and the second internal electrode layer 50b preferably covers the dielectric layer 40 in a percentage of about 60% or more and about 80% or less, for example, when an LW section is viewed from the T direction. The number of the first internal electrode layers 50a and the second internal electrode layers 50b is preferably about 150 or more and about 400 or less, for example.

Each of the first internal electrode layer 50a and the second internal electrode layer 50b has a coverage in the central portion in the W direction that is lower than a coverage within about 30.000 μm from the end portion in the W direction, and has a shifting amount in the W direction of about 0.000 μm or more and about 10.000 μm or less, for example.

The coverage in this context is defined as follows. First, the first lateral portion 34a and the second lateral portion 34b (namely, W gaps of both sides), and the first end portion 36a or the second end portion 36b (namely, L gap of either side) are removed by polishing. Next, the first internal electrode layer 50a or the second internal electrode layer 50b is electrolytically peeled off from the dielectric layer 40 by using a solution, and the first internal electrode layer 50a or the second internal electrode layer 50b that has been located in the central portion in the T direction is exposed. For the exposed first internal electrode layer 50a or second internal electrode layer 50b, an observation site image is acquired by an optical microscope. Then for the portion to be observed in the acquired observation site image, under the microscope with 1000 magnification, a percentage of the area in which the first internal electrode layer 50a or the second internal electrode layer 50b is provided, relative to the area of the entire one visual field is calculated as a detection region percentage. Regarding the visual field to be observed, for 5 chips, four planes (four planes signify four internal electrodes in the central portion in the T direction when viewed in WT plane) are observed for the first internal electrode layer 50a or the second internal electrode layer 50b located in the central portion in the T direction. Five visual fields are selected for each plane (i.e., LW plane), and a total of 100 visual fields are selected and observed. For each visual field, a detection region percentage is calculated, and a mean value of 100 visual fields is defined as the coverage.

Preferably, for example, in the first internal electrode layer 50a, a coverage within about 30.000 μm from the end portion in the L direction of the side that is not connected with the first external electrode 60a is lower than a coverage within about 30.000 µm from the end portion in the W direction, and in the second internal electrode layer 50b, a coverage within about 30.000 µm from the end portion in the L direction of the side that is not connected with the second external electrode 60b is lower than a coverage within about 30.000 µm from the end portion in the W direction.

Since the method of defining a coverage referred herein is the same as the method of defining a coverage in the central portion in the W direction of the first internal electrode layer 50a or the second internal electrode layer 50b, and a coverage within about 30.000 µm from the end portion in the W direction, the description thereof is not repeated.

Preferably, a Ni—Sn reaction layer is provided at the boundary between the first internal electrode layer 50a and the second internal electrode layer 50b, and the dielectric layer 40, and the Ni—Sn reaction layer is continuously provided linearly in a length of about 50.0% or more and about 100.0% or less, for example, of the W dimension of each of the first internal electrode layer 50a and the second internal electrode layer 50b, and has a thickness of about 5 nm or more and about 20 nm or less, for example. As a result, the Ni—Sn reaction layer defines and functions as a chemical potential barrier, and thus the high temperature load life of the multilayer ceramic capacitor 10 is improved. When the Ni—Sn reaction layer has a continuity of lower than about 50.0% of the W dimension of each of the first internal electrode layer 50a and the second internal electrode layer 50b, and when the Ni—Sn reaction layer has a thickness of smaller than about 5 nm, a desired potential barrier is not obtained, and improvement in high temperature load life is insufficient. When the Ni—Sn reaction layer has a continuity of higher than about 100% of the W dimension of each of the first internal electrode layer 50a and the second internal electrode layer 50b, and when the Ni—Sn reaction layer has a thickness of larger than about 20 nm, Ni in the first internal electrode layer 50a and the second internal electrode layer 50b is balled, and the reliability is impaired.

Here, a method of quantifying the continuity and the thickness of the Ni—Sn reaction layer is described. First, the multilayer ceramic capacitor 10 is polished to the central portion of the L dimension from the first end surface 26a or the second end surface 26b to expose a WT section. Next, the exposed WT section is sliced by ion beam process (FIB). Further, in the central portion in the T direction of the sliced WT section, 20 visual fields are randomly selected along the W direction, and element distribution mapping observation is conducted for each of the selected visual fields using a scanning transmission electron microscope-energy dispersive X-ray spectroscope (STEM-EDS). In this manner, the continuity and the thickness of the Ni—Sn reaction layer are quantified.

Preferably, as shown in FIG. 4, in a portion adjacent to each dielectric layer 40 of the plurality of first internal electrode layers 50a and the plurality of second internal electrode layers 50b, Mg segregates. A Mg segregation amount of each of the first internal electrode layer 50a or the second internal electrode layer 50b that is located closest to the outer layer side is preferably about 0.05 or less, for example, by elemental ratio Mg/Ni. As described above, the multilayer ceramic capacitor 10 according to the present preferred embodiment has improved high temperature reliability and is capable of reducing or preventing the occurrence of initial short circuits because the content of Mg that segregates in the portion adjacent to the dielectric layers 40 of each of the plurality of internal electrode layers 50a and the plurality of internal electrode layers 50b. By controlling the Mg segregation amount in each of the first internal electrode layer 50a or the second internal electrode layer 50b that is located closest to the outer layer side to about 0.05 or less by elemental ratio Mg/Ni, the moisture proof reliability is improved.

Here, a method of confirming the Mg segregation and a method for confirming the elemental ratio Mg/Ni are described. First, polishing is conducted to the position of about ½ in the L direction from the first end surface 26a or the second end surface 26b to expose a WT section. Next, to confirm the segregation of Mg in each of the plurality of first internal electrode layers 50a and second internal electrode layers 50b, 100 visual fields are randomly selected in the internal electrode layer of the exposed WT section. Then the selected 100 visual fields are observed using a scanning electron microscope. For each visual field, a spectrum is acquired using the scanning electron microscope, and an elemental ratio Mg/Ni is calculated. The elemental ratio Mg/Ni is a mean value of 100 points of elemental ratio of each visual field. In this manner, the elemental ratio Mg/Ni is able to be confirmed.

Preferably, as shown in FIG. 4, in an end portion in the W direction of each of the first internal electrode layer 50a and the second internal electrode layer 50b, Ni—Mg—Mn—O glass segregates. As a result, the multilayer ceramic capacitor 10 according to the present preferred embodiment has a further improved high temperature reliability, by further controlling the content of Mg included in a lateral portion of the laminate, to make Ni—Mg—Mn—O glass segregate in an end portion in the W direction of each of the first internal electrode layer 50a and the second internal electrode layer 50b.

Preferably, the dimension along the W direction of the region where Ni—Mg—Mn—O glass segregates is about 1.000 µm or less, for example. As a result, the multilayer ceramic capacitor 10 according to the present preferred embodiment has the high temperature reliability, and is able to have an ameliorated initial short circuit rate by controlling the content of Si included in a W gap so that the dimension along the W direction of the region to which Ni—Mg—Mn—O glass segregates is about 1.000 µm or less.

Here, a method of confirming the region at which Ni—Mg—Mn—O glass segregates, and a method of measuring the dimension of the region along the W direction are described. First, the multilayer ceramic capacitor 10 is polished to the central portion of the L dimension from the first end surface 26a or the second end surface 26b to expose a WT section. Next, using a scanning electron microscope (FE-WDX), a spectrum of the first internal electrode layer 50a or the second internal electrode layer 50b located near the central portion of the exposed WT section is acquired, and a region in which Ni—Mg—Mn—O glass segregates is identified. Then, the dimension along the W direction of the region at which Ni—Mg—Mn—O glass segregates is quantified by mapping analysis. The dimension may be calculated, for example, by randomly selecting 100 points of end portions in the W direction of the first internal electrode layer 50a or the second internal electrode layer 50b in the exposed WT section, and determining a mean value of the dimension along the W direction of the region where Ni—Mg—Mn—O glass segregates, measured at the selected 100 points. The end portion in the W direction of the first internal electrode layer 50a and the second internal electrode layer 50b means within about 30.000 µm from an end portion in the W direction of the first internal electrode layer 50a or the second internal electrode layer 50b.

The first external electrode 60a is electrically connected with the first internal electrode layer 50a and provided on the first end surface 26a. The first external electrode 60a preferably includes a portion provided on the first end surface 26a, and extends to a portion of each of the first principal surface 22a, the second principal surface 22b, the first lateral surface 24a and the second lateral surface 24b. The first external electrode 60a may be provided only on the first end surface 26a. The second external electrode 60b is electrically connected with the second internal electrode layer 50b and provided on the second end surface 26b. The second external electrode 60b preferably includes a portion provided on the second end surface 26b, and extends to a portion of each of the first principal surface 22a, the second principal surface 22b, the first lateral surface 24a and the second lateral surface 24b. The second external electrode 60b may be provided only on the second end surface 26b.

The first external electrode 60a includes a first underlying electrode layer provided on the surface of the laminate 20 and a first plating layer provided on the surface of the first underlying electrode layer. Similarly, the second external electrode 60b includes a second underlying electrode layer provided on the surface of the laminate 20 and a second plating layer provided on the surface of the second underlying electrode layer.

Each of the first underlying electrode layer and the second underlying electrode layer includes at least one layer selected from a baked layer, a resin layer, a thin film layer and other suitable layer.

Preferably, the first underlying electrode layer includes a baked layer including a portion provided on the first end surface 26a, and extending to a portion of each of the first principal surface 22a, the second principal surface 22b, the first lateral surface 24a and the second lateral surface 24b, and the second underlying electrode layer includes a baked layer including a portion provided on the second end surface 26b, and extending to a portion of each of the first principal surface 22a, the second principal surface 22b, the first lateral surface 24a and the second lateral surface 24b. The baked layer includes glass and metal. Examples of glass in the baked layer include at least one selected from Cu, Ni, Ag, Pd, Ag—Pd alloy and Au. The baked layer is formed by applying a conductive paste including glass and metal to the laminate 20 and baking the conductive paste. At this time, the baked layer may be formed by simultaneous firing with the first internal electrode layer 50a and the second internal electrode layer 50b, or may be formed by baking after firing the first internal electrode layer 50a and the second internal electrode layer 50b. A plurality of the baked layers may be provided. The thickness of the thickest portion of the baked layer is preferably about 10 μm or more and about 30 μm or less, for example.

The resin layer may be provided on the surface of the baked layer, or may be directly provided on the surface of the laminate 20 without the baked layer interposed therebetween. The resin layer may preferably include conductive grains and a thermosetting resin, for example. A plurality of the resin layers may be provided. The resin layer may be provided only on the first end surface 26a and the second end surface 26b, or may be provided to extend to a portion of each of the first principal surface 22a, the second principal surface 22b, the first lateral surface 24a and the second lateral surface 24b. In the resin layer, the amount of extension to each of the first principal surface 22a, the second principal surface 22b, the first lateral surface 24a, and the second lateral surface 24b is preferably smaller than that of the baked layer. Therefore, even when the resin layer is provided, an end portion of the baked layer provided on a portion of each of the first principal surface 22a, the second principal surface 22b, the first lateral surface 24a, and the second lateral surface 24b is directly covered with the first plating layer or the second plating layer.

The first plating layer covers the first underlying electrode layer. The second plating layer covers the second underlying electrode layer. The first plating layer preferably has a uniform or substantially uniform thickness on the surface of the first underlying electrode layer so as not to influence on the protruding shape of a later-described protruding portion 70 which is a portion of the baked layer of the first external electrode 60a. Similarly, the second plating layer preferably has a uniform or substantially uniform thickness on the surface of the second underlying electrode layer so as not to influence on the protruding shape of the later-described protruding portion 70 which is a portion of the baked layer of the second external electrode 60b. Preferably, each of the first plating layer and the second plating layer is made of at least one metal selected from, for example, Cu, Ni, Sn, Pb, Au, Ag, Pd, Bi and Zn, or an alloy including the metal. Preferably, a metal percentage per unit area of each of the first plating layer and the second plating layer is about 99% or more, for example. Preferably, each of the first plating layer and the second plating layer does not include glass.

A plurality of each of the first plating layer and the second plating layer may be provided. Preferably, the first plating layer includes lower layer plating provided on the surface of the first underlying electrode layer, and upper layer plating provided on the surface of the lower layer plating. Similarly, preferably, the second plating layer includes lower layer plating provided on the surface of the second underlying electrode layer, and upper layer plating provided on the surface of the lower layer plating. For example, when each of the first internal electrode layer 50a and the second internal electrode layer 50b is made using Ni, the respective lower layer plating of the first plating layer and the second plating layer is preferably made using Cu that is well bondable with the Ni. As the upper layer plating, it is preferred to use Sn or Au that is excellent in solder wettability. The upper layer plating may be provided as necessary, and each of the first plating layer and the second plating layer may include only the lower layer plating. The upper layer plating may be an outermost layer, or other plating layer may further be provided on the surface of the upper layer plating.

Preferably, each of the first plating layer and the second plating layer has a bilayer structure including a Ni plating layer, and a Sn plating layer provided on the surface of the Ni plating layer, for example. By providing the Ni plating layer on the surface of the first underlying electrode layer, it is possible to prevent the first underlying electrode layer from being eroded by the solder. Also by providing the Sn plating layer on the surface of the Ni plating layer, the solder wettability is improved, and thus, the mounting operation is facilitated. Since the same effect is achieved by the Ni plating layer provided on the surface of the second underlying electrode layer, and the Sn plating layer provided on the surface of the Ni plating layer, the description is not repeated here. Preferably, the thickness per one layer of each of the first plating layer and the second plating layer is about 2 μm or more and about 6 μm or less, for example.

The baked layer of the first external electrode 60a includes, in a portion provided on the second principal surface 22b side, the protruding portion 70 that protrudes in the T direction. An apex 72 of the protruding portion 70 is located near a ridge portion at which the second principal surface 22b and the first end surface 26a intersect, particularly, in the L direction, and extends along the W direction from a position slightly outside in the W direction than the first lateral surface 24a to the position slightly outside in the W direction than the second lateral surface 24b. Regarding the portion provided on the second principal surface 22b side of the baked layer of the first external electrode 60a, when a first line $x_1$ connecting a leading end 62 of the second end surface 26b side and the apex 72 of the protruding portion 70 is defined, a dimension $t_1$ along the T direction between a point 64 on the surface of the portion provided on the second principal surface 22b side where a perpendicular or substantially perpendicular line that is drawn from the first line $x_1$ to the surface of the portion provided on the second principal surface 22b side to cross the first line $x_1$ at right angles is the longest, and the apex 72 of the protruding portion 70 is preferably about 0.5 μm or more and about 35 μm or less, for example.

The baked layer of the second external electrode 60b includes, in a portion provided on the second principal surface 22b side, the protruding portion 70 that protrudes in the T direction. The apex 72 of the protruding portion 70 is located near a ridge portion at which the second principal surface 22b and the second end surface 26b intersect, particularly, in the L direction, and extends along the W direction from a position slightly outside in the W direction than the first lateral surface 24a to the position slightly outside in the W direction than the second lateral surface 24b. Regarding the portion provided on the second principal surface 22b side of the baked layer of the second external electrode 60b, when a second line $x_2$ connecting the leading end 62 of the first end surface 26a side and the apex 72 of the protruding portion 70 is defined, a dimension $t_2$ along the T direction between the point 64 on the surface of the portion provided on the second principal surface 22b side at which a perpendicular or substantially perpendicular line that is drawn from the second line $x_2$ to the surface of the portion provided on the second principal surface 22b side to cross the second line $x_2$ at right angles is the longest, and the apex 72 of the protruding portion 70 is preferably about 0.5 μm or more and about 35 μm or less, for example. The illustration of the portion is not repeated here because it is the same or substantially the same as the portion provided on the second principal surface 22b side of the baked layer of the first external electrode 60a.

As described above, the multilayer ceramic capacitor 10 according to the present preferred embodiment includes the protruding portion 70 that protrudes in the T direction into each of the portion provided on the second principal surface 22b side of the first external electrode 60a, and the portion provided on the second principal surface 22b side of the second external electrode 60b. Preferably, the dimension $t_1$ along the T direction between the point 64 on the surface of the baked layer, and the apex 72 of the protruding portion 70 is about 0.5 μm or more and about 35 μm or less, for example. Further, preferably, the dimension along the T direction of the multilayer ceramic capacitor (T dimension as will be described later) is about 0.18 mm or more and about 0.70 mm or less, for example. As a result, the protruding portion 70 effectively operates as an anchor, and improves the fixing strength between the multilayer ceramic capacitor 10 and the substrate. As a result, the multilayer ceramic capacitor 10 according to the present preferred embodiment has improved mountability with a substrate.

Preferably, regarding the surface of the portion provided on the second principal surface 22b side of the baked layer of the first external electrode 60a, denoting the dimension along the surface of the first external electrode 60a from the leading end 62 of the second end surface 26b side to the first end surface 26a as $d_1$, and the dimension along the L direction from the leading end 62 of the second end surface 26b side to the first end surface 26a as $e_1$, $d_1/e_1$ is about 1.0045 or more and about 1.4 or less, for example.

Preferably, regarding the surface of the portion provided on the second principal surface 22b side of the baked layer of the second external electrode 60b, denoting the dimension along the surface of the second external electrode 60b from the leading end 62 of the first end surface 26a side to the second end surface 26b as $d_2$, and the dimension along the L direction from the leading end 62 of the first end surface 26a side to the second end surface 26b as $e_2$, $d_2/e_2$ is about 1.0045 or more and about 1.4 or less, for example. The illustration of the portion is not repeated here because it is the same or substantially the same as the portion provided on the second principal surface 22b side of the baked layer of the first external electrode 60a.

In the multilayer ceramic capacitor 10 according to the present preferred embodiment, since the portion provided on the second principal surface 22b side of the first external electrode 60a and the portion provided on the second principal surface 22b side of the second external electrode 60b respectively have the shapes as described above, the mountability with the substance is further improved.

The multilayer ceramic capacitor 10 according to the present preferred embodiment also includes, in the portion provided on the first principal surface 22a side of the baked layer of the first external electrode 60a, a similar protruding portion 70, and, in the portion provided on the first principal surface 22a side of the baked layer of the second external electrode 60b, a similar protruding portion 70. As a result, it is no longer necessary to consider the directivity in the T direction for the multilayer ceramic capacitor 10 according to the present preferred embodiment, and thus, the mounting operation is able to be easily performed.

Also the multilayer ceramic capacitor 10 according to the present preferred embodiment includes, in the portion provided on the first lateral surface 24a side of the baked layer of the first external electrode 60a, a similar protruding portion 70 protruding in the W direction. The protruding portion 70 extends along the T direction such that it connects the end portion on the first lateral surface 24a side of the protruding portion 70 protruding from the portion provided on the first principal surface 22a side of the same baked layer, and the end portion on the first lateral surface 24a side of the protruding portion 70 protruding from the portion provided on the second principal surface 22b side of the same baked layer. Similarly, the multilayer ceramic capacitor 10 according to the present preferred embodiment includes, in the portion provided on the first lateral surface 24a side of the baked layer of the second external electrode 60b, a similar protruding portion 70 protruding in the W direction. The protruding portion 70 extends along the T direction such that it connects the end portion on the first lateral surface 24a side of the protruding portion 70 protruding from the portion provided on the first principal surface 22a side of the same baked layer, and the end portion on the first lateral surface 24a side of the protruding portion 70 protruding from the portion provided on the second principal surface 22b side of the same baked layer.

Further, the multilayer ceramic capacitor 10 according to the present preferred embodiment includes, in the portion provided on the second lateral surface 24b side of the baked layer of the first external electrode 60a, a similar protruding portion protruding in the W direction. The protruding portion 70 extends along the T direction such that it connects the end portion on the second lateral surface 24b side of the protruding portion 70 protruding from the portion provided on the first principal surface 22a side of the same baked layer, and the end portion on the second lateral surface 24b side of the protruding portion 70 protruding from the portion provided on the second principal surface 22b side of the same baked layer. Similarly, the multilayer ceramic capacitor 10 according to the present preferred embodiment includes, in the portion provided on the second lateral surface 24b side of the baked layer of the second external electrode 60b, a similar protruding portion 70 protruding in the W direction. The protruding portion 70 extends along the T direction such that it connects the end portion on the second lateral surface 24b side of the protruding portion 70 protruding from the portion provided on the first principal surface 22a side of the same baked layer, and the end portion on the second lateral surface 24b side of the protruding portion 70 protruding from the portion provided on the second principal surface 22b side of the same baked layer.

As described above, the multilayer ceramic capacitor 10 according to the present preferred embodiment also includes, in the portion provided on the first lateral surface 24a side of the baked layer of the first external electrode 60a, a similar protruding portion 70 protruding in the W direction, and includes, in the portion provided on the first lateral surface 24a side of the baked layer of the second external electrode 60b, a similar protruding portion 70 protruding in the W direction. Similar, the multilayer ceramic capacitor 10 according to the present preferred embodiment also includes, in the portion provided on the second lateral surface 24b side of the baked layer of the first external electrode 60a, a similar protruding portion 70 protruding in the W direction, and includes, in the portion provided on the second lateral surface 24b side of the baked layer of the second external electrode 60b, a similar protruding portion 70 protruding in the W direction. As a result, it is no longer necessary to consider the directivity in the W direction, in addition to the directivity in the T direction, for the multilayer ceramic capacitor 10 according to the present preferred embodiment, and thus, the mounting operation is more easily performed.

Denoting the dimension in the T direction of the multilayer ceramic capacitor 10 according to the present preferred embodiment as T dimension, the dimension in the W direction as W dimension, and the dimension in the L direction as L dimension, preferred dimensions are as shown in Table 1. Table 1 shows a total of eight preferred configurations of the multilayer ceramic capacitor 10 in which the thickness per one layer of the dielectric layer 40 and the number of internal electrode layers (a total number of the first internal electrode layers 50a and the second internal electrode layers 50b) are appropriately varied in addition to the T dimension, W dimension and L dimension. The dimensions of the multilayer ceramic capacitor 10 may be measured using, for example, a micrometer or an optical microscope.

TABLE 1

| Sample No. | | T dimension (mm) | W dimension (mm) | L dimension (mm) | Thickness of dielectric layer (μm) | Number of internal electrode layers |
|---|---|---|---|---|---|---|
| Multilayer ceramic capacitor | 1 | 0.300 ± 0.090 | 0.300 ± 0.090 | 0.600 ± 0.090 | 0.48 ± 0.10 | 100 or more and 500 or less |
| | 2 | 0.200 ± 0.050 | 0.200 ± 0.050 | 0.400 ± 0.050 | 0.48 ± 0.10 | 50 or more and 300 or less |
| | 3 | 0.300 ± 0.050 | 0.200 ± 0.050 | 0.400 ± 0.050 | 0.48 ± 0.10 | 100 or more and 500 or less |
| | 4 | 0.300 ± 0.050 | 0.300 ± 0.050 | 0.400 ± 0.050 | 0.48 ± 0.10 | 100 or more and 500 or less |
| | 5 | 0.250 ± 0.025 | 0.250 ± 0.025 | 0.500 ± 0.025 | 0.48 ± 0.10 | 100 or more and 500 or less |
| | 6 | 0.500 ± 0.050 | 0.500 ± 0.050 | 0.800 ± 0.050 | 0.48 ± 0.10 | 200 or more and 1000 or less |
| | 7 | 0.600 ± 0.050 | 0.450 ± 0.050 | 0.750 ± 0.050 | 0.48 ± 0.10 | 200 or more and 1000 or less |
| | 8 | 0.500 ± 0.200 | 0.500 ± 0.200 | 1.000 ± 0.200 | 0.48 ± 0.10 | 200 or more and 1000 or less |

The thickness per one layer of the dielectric layer 40 is measured, for example, in the following manner. First, the multilayer ceramic capacitor 10 is polished to the central portion of the L dimension from the first end surface 26a or the second end surface 26b to expose a WT section. Next, the exposed WT section is observed using a scanning electron microscope, and on each of the center line of the W direction extending in the T direction, and lines extending in the T direction that are drawn two for each side at equivalent intervals on both sides in the W direction from the center line (that is, on a total of five lines), a thickness per one layer of the dielectric layer 40 located in the central portion in the T direction is measured. Lastly, a mean value of thickness measured at a total of five points is calculated. For measuring the thickness of the dielectric layer 40 more accurately, for example, the thickness per one layer of the dielectric layer 40 located above or below each of the five lines may be measured, and a mean value of thickness measured at a total of 15 points may be calculated.

Each of the first internal electrode layer 50a and the second internal electrode layer 50b according to a preferred embodiment of the present invention has a coverage in the central portion in the W direction that is lower than a coverage within about 30.000 μm from the end portion in the W direction. As a result, the multilayer ceramic capacitor 10 according to a preferred embodiment of the present invention has improved moisture proof reliability. Further, in the multilayer ceramic capacitor 10 according to the present preferred embodiment, since a shifting amount in the W direction of the first internal electrode layer 50a and the second internal electrode layer 50b is preferably about 0.000 μm or more and about 10.000 μm or less, for example, initial short circuit defects are reduced or prevented. Thus, in the multilayer ceramic capacitor 10 according to the present preferred embodiment, the moisture proof reliability in an actual use environment is improved, and initial short circuit defects are reduced or prevented by reducing the entry route of water.

Preferably, in a preferred embodiment of the present invention, the first internal electrode layer 50a has a coverage within about 30.000 μm from the end portion in the L direction of the side not connected with the first external electrode 60a that is lower than a coverage within about 30.000 μm from the end portion in the W direction, and the second internal electrode layer 50b has a coverage within about 30.000 μm from the end portion in the L direction of the side not connected with the second external electrode 60b that is lower than a coverage within about 30.000 μm from the end portion in the W direction. As a result, the moisture proof reliability of the multilayer ceramic capacitor 10 is further improved.

In an aforementioned preferred embodiment of the present invention, description was provided for a case in which each of the baked layer of the first external electrode 60a and the baked layer of the second external electrode 60b includes the protruding portion 70 in all of the portion provided on the first principal surface 22a side, the portion provided on the second principal surface 22b side, the portion provided on the first lateral surface 24a side, and the portion provided on the second lateral surface 24b side. However, without being limited to this case, each of the baked layer of the first external electrode 60a and the baked layer of the second external electrode 60b is only required to include the protruding portion 70 at least in the portion provided on the second principal surface 22b side. That is, each of the baked layer of the first external electrode 60a and the baked layer of the second external electrode 60b may include, for example, the protruding portion 70 only in the portion provided on the second principal surface 22b side. As a result, it is possible to reduce the dimension of the multilayer ceramic capacitor 10, and thus it is possible to improve the degree of freedom of mounting.

In the aforementioned preferred embodiment, description was provided for the case in which the protruding portion 70 in the portion provided on the second principal surface 22b side of the baked layer of the first external electrode 60a extends along the W direction from the position slightly outside in the W direction than the first lateral surface 24a to the position slightly outside in the W direction than the second lateral surface 24b. However, without being limited to this case, the protruding portion 70 may be provided, for example, only in a corner portion and its vicinity at which the second principal surface 22b, the first lateral surface 24a, and the first end surface 26a intersect, and in a corner portion and its vicinity at which the second principal surface 22b, the second lateral surface 24b, and the first end surface 26a intersect. The same applies to each of the protruding portion 70 in the portion provided on the first principal surface 22a side of the baked layer of the first external electrode 60a, the protruding portion 70 in the portion provided on the second principal surface 22b of the baked layer of the second external electrode 60b, and the protruding portion 70 in the portion provided on the first principal surface 22a side of the baked layer of the second external electrode 60b, and thus description thereof is not repeated here.

The multilayer ceramic capacitor 10 may not include the protruding portion 70. In such a case, for example, each of the first underlying electrode layer and the second underlying electrode layer may not include a baked layer, and may include at least one layer selected from a resin layer, a thin-film layer, or another suitable layer.

Figure 6:
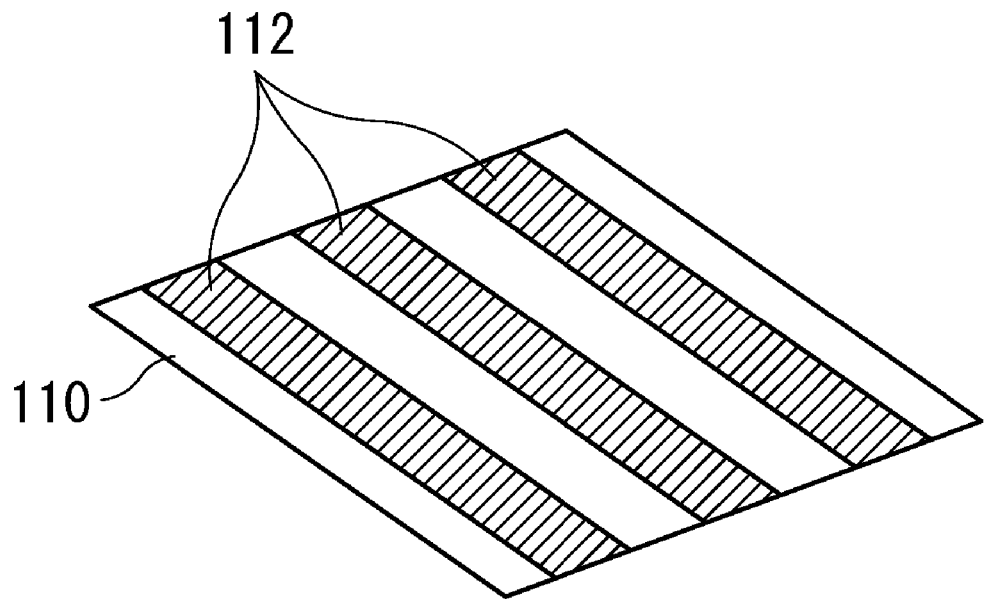
FIG. 6 is a perspective view of a ceramic sheet on which an internal electrode pattern is printed, prepared in one example of a production method of a multilayer ceramic capacitor according to a preferred embodiment of the present invention.
Figure 7:
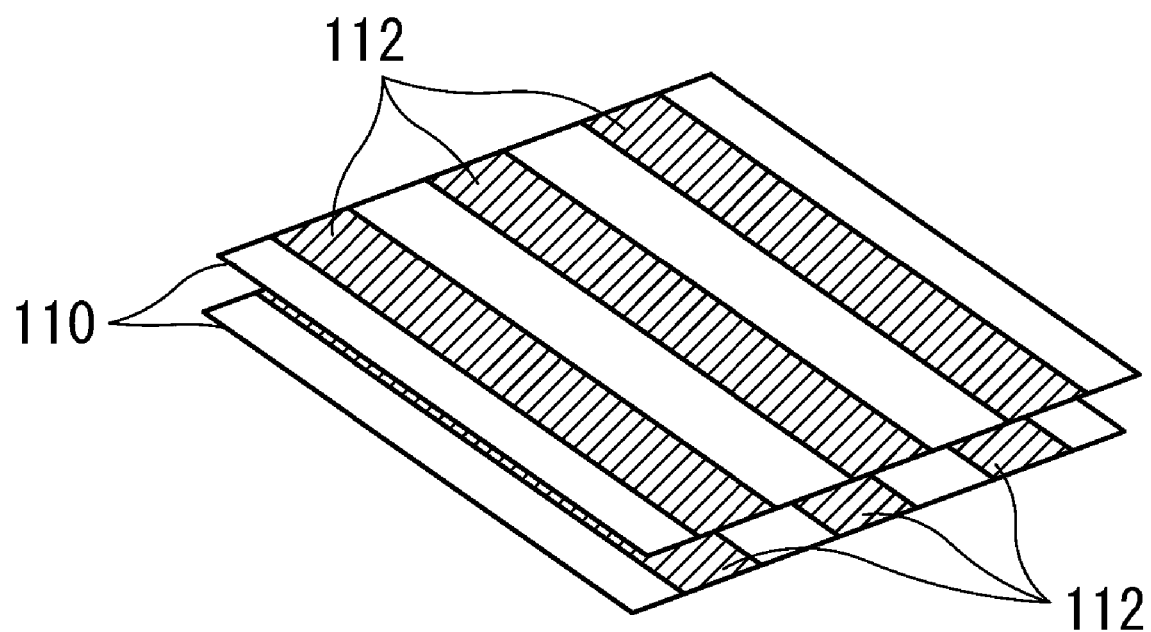
FIG. 7 is a perspective view showing the appearance of laminating a ceramic sheet on which an internal electrode pattern is printed, prepared in one example of a production method of a multilayer ceramic capacitor according to a preferred embodiment of the present invention.
Figure 8:
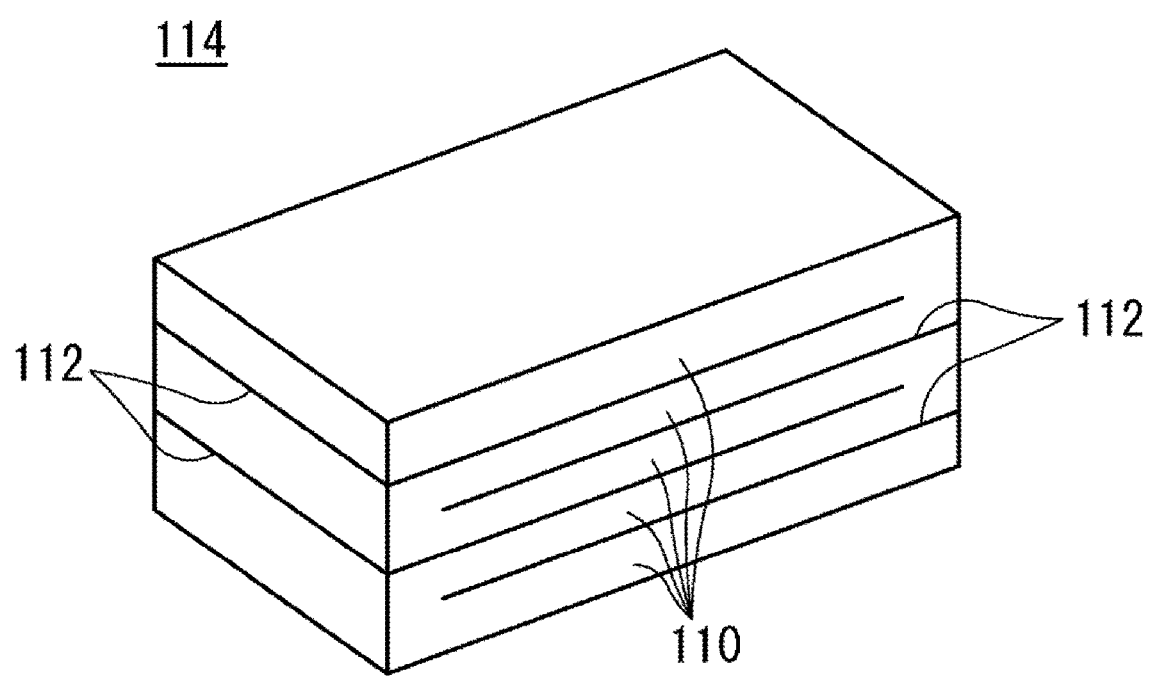
FIG. 8 is a perspective view of a green multilayer chip prepared in one example of a production method of a multilayer ceramic capacitor according to a preferred embodiment of the present invention.

Next, a non-limiting example of a production method of a multilayer ceramic capacitor according to a preferred embodiment of the present invention is described by referring to FIG. 6 to FIG. 8. The following description is provided with respect to the case of mass producing the multilayer ceramic capacitor 10 according to a preferred embodiment of the present invention as an example. FIG. 6 is a perspective view of a ceramic sheet on which an internal electrode pattern is printed, prepared in one example of a production method of the multilayer ceramic capacitor according to a preferred embodiment of the present invention. FIG. 7 is a perspective view showing the appearance of laminating a ceramic sheet on which an internal electrode pattern is printed, prepared in one example of a production method of the multilayer ceramic capacitor according to a preferred embodiment of the present invention. FIG. 8 is a perspective view of a green multilayer chip prepared in one example of a production method of the multilayer ceramic capacitor according to a preferred embodiment of the present invention.

First, ceramic green sheets for outer layers defining outer layer portions of the plurality of dielectric layers 40, and ceramic green sheets for inner layers defining inner layer portions of the plurality of dielectric layers 40 are prepared. Also, a ceramic green sheet that is a functional sheet defining a W gap of the laminate 20 is prepared. The thickness of the ceramic green sheet for outer layers and the ceramic green sheet for inner layers before firing is preferably about 0.2 μm or more and about 1.5 μm or less, for example.

Also a conductive paste for internal electrodes defining the first internal electrode layer 50a and the second internal electrode layer 50b, and a conductive paste defining an underlying electrode layer of each of the first external electrode 60a and the second external electrode 60b are prepared.

A material of the ceramic green sheet for inner layer includes Ba, Ti, Dy, Mn, Si, V, Al, Zr and Ca. Here, it is preferable that about 0.2 parts by mol or more and about 0.5 parts by mol or less of Dy, for example, is included, relative to 100 parts by mol of Ti. Also it is preferable that about 0.288 parts by mol or more and about 0.35 parts by mol or less of V, for example, is included, relative to 100 parts by mol of Ti. Further, it is preferable that Zr is about 0.04 parts by mol or less, for example, relative to 100 parts by mol of Ti. In addition to these components, a Mn compound and a Mg compound may be included as accessory components. As the accessory components, compounds such as Ca compounds, Fe compounds, Cr compounds, Co compounds or Ni compounds, and rare earth element compounds, for example, may preferably be used.

A material of the ceramic green sheet for outer layers, and the ceramic green sheet that is a functional sheet includes Ba, Ti, Dy, Mn, Si, V, Al, Zr, Ca and Mg.

The content of each of Dy, V and Zr is preferably the same or substantially the same as that in the case of the ceramic green sheet for inner layers, and the same applies also to the accessory components.

A material of the conductive paste for internal electrodes preferably includes, for example, Ni as a main component, and further includes $SnO_2$ and Mg.

A material of the conductive paste for external electrodes preferably includes at least one selected from, for example, Cu, Ni, Ag, Pd, Ag—Pd alloy and Au.

The conductive paste for internal electrodes and the conductive paste for external electrodes include an organic binder and a solvent. As the organic binder and the solvent, known organic binders and organic solvents may be used. The conductive paste for internal electrodes and the conductive paste for external electrodes are adjusted to have a constant viscosity.

Since the conductive paste for internal electrodes includes Ni as a main component, and further includes $SnO_2$, it is possible to form a Ni—Sn reaction layer described in a preferred embodiment described above.

By varying the dispersion state of $SnO_2$ included in the conductive paste for internal electrodes, the continuity of the Ni—Sn reaction layer is adjusted, and the Ni—Sn reaction layer is able to be formed continuously in a length of about 50.0% or more and about 100.0% or less, for example, of the W dimension of each of the first internal electrode layer 50a and the second internal electrode layer 50b. Further, by adjusting the content of $SnO_2$ included in the conductive paste for internal electrodes, it is possible to make the thickness of the Ni—Sn reaction layer about 5 nm or more and about 20 nm or less, for example.

Further, since the conductive paste for internal electrodes includes Mg, it is possible to make Mg segregate in a portion adjacent to the dielectric layer 40 of each of the plurality of first internal electrode layers 50a and the plurality of second internal electrode layers 50b. Also since the ceramic green sheet for outer layers includes Mg, it is possible to make Mg segregate in each of the first internal electrode layer 50a or the second internal electrode layer 50b that is located closest to the outer layer side. By controlling the content of Mg, it is possible to make the Mg segregation amount of each of the first internal electrode layer 50a or the second internal electrode layer 50b that is located closest to the outer layer side about 0.05 or less, for example, by elemental ratio Mg/Ni.

Since the ceramic green sheet that is a functional sheet includes Si, the conductive paste for internal electrodes includes Ni as a main component, the ceramic green sheet that is a functional sheet that defines W gap includes Mg, and the ceramic green sheet that is a functional sheet includes Mn, it is possible to make Ni—Mg—Mn—O glass segregate in an end portion in the W direction of each of the first internal electrode layer 50a and the second internal electrode layer 50b. The dimension along the W direction of the region in which Ni—Mg—Mn—O glass segregates is able to be adjusted by controlling the content of Si included in the ceramic green sheet that is a functional sheet.

Then as shown in FIG. 6, by printing a conductive paste for internal electrodes on the ceramic green sheet for inner layers 110, a conductive pattern 112 which is to be the first internal electrode layer 50a or the second internal electrode layer 50b is formed longitudinally at regular intervals. The printing method of the conductive paste for internal electrodes may be achieved by various printing methods such as, for example, a screen printing method, or a gravure printing method.

First, a predetermined number of ceramic green sheets for outer layers, on which the conductive pattern 112 is not formed are laminated so that the thickness thereof is preferably about 0.5 µm or more and about 5 µm or less, for example. Next, as shown in FIG. 7, preferably about 5 or more and about 1500 or less, for example, of ceramic green sheets for inner layers 110 on which the conductive pattern 112 is formed are laminated while being shifted at a regular pitch. Lastly, a predetermined number of ceramic green sheets for outer layers, on which the conductive pattern 112 is not formed are laminated so that the thickness thereof is preferably about 5 µm or more and about 100 µm or less, for example.

Then by pressing in the T direction using a rigid body pressing or isostatic pressing, for example, the ceramic green sheets are pressure bonded at a predetermined temperature, and thus a multilayer block is prepared.

By pressure bonding the ceramic green sheets at a predetermined temperature in this manner, the ceramic green sheets are adhered to each other. By disposing a resin sheet having a certain thickness as the outermost layer, a pressure is applied to the portion in which the conductive pattern 112 is not formed, and the adhesion power between ceramic green sheets is improved.

Then by cutting the multilayer block, a green multilayer chip 114 as shown in FIG. 8 is formed from the multilayer block. Cutting of the multilayer block may be achieved by various methods, such as cutting with a dicing machine or hand push cutting, for example. Here, since the conductive patterns 112 are cut at the position at which the surfaces of the internal electrodes are exposed in the W direction, the end portions in the W direction of the internal electrodes are aligned in the T direction. By cutting only in the W direction of the conductive patterns 112, a bar-shaped chip assembly may be produced.

As shown in FIG. 8, on both lateral surfaces and both end surfaces of the multilayer chip 114, the conductive pattern 112s that are to be the first internal electrode layers 50a and the second internal electrode layers 50b are exposed. Therefore, by bonding a ceramic green sheet as a functional sheet to be a dielectric body to each of the both the lateral surfaces of the multilayer chip 114, the exposed conductive patterns 112 are covered. Then by conducting barrel finishing, for example, corner portions and ridge portions may be rounded.

Then the green multilayer chip 114 is fired using a predetermined temperature profile. In this firing step, the dielectric layers 40, the first internal electrode layers 50a, and the second internal electrode layers 50b are fired. The firing temperature may be appropriately set depending on the kind of the dielectric material or the conductive paste for internal electrode to be used, and may preferably be, for example, about 900° C. or more and about 1300° C. or less. At this time, the temperature rising speed of the predetermined temperature profile is appropriately adjusted so that a coverage in the central portion in the W direction is preferably lower than a coverage within about 30.000 µm from the end portion in the W direction regarding the first internal electrode layer 50a and the second internal electrode layer 50b. Also a coverage within about 30.000 µm from the end portion in the L direction of the side not connected with the first external electrode 60a, that is lower than a coverage within about 30.000 µm from the end portion in the W direction in the first internal electrode layer 50a regarding the first internal electrode layer 50a, and a coverage within about 30.000 µm from the end portion in the L direction of the side not connected with the second external electrode 60b, that is lower than a coverage within about 30.000 µm from the end portion in the W direction regarding the second internal electrode layer 50 may also preferably be achieved by appropriately adjusting the temperature rising speed of the predetermined temperature profile.

Then by applying a conductive paste for external electrodes to each of both end surfaces of the fired multilayer chip by dipping and baking the conductive paste, respective baked layers of the first external electrode 60a and the second external electrode 60b are formed. The baking temperature at this time is preferably about 700° C. or more and about 900° C. or less, for example. At this time, a protruding portion is formed integrally with the baked layer.

Lastly, a plating layer is formed on the surface of the underlying electrode layer by electrolytic plating, for example, as necessary. At this time, it is preferable to subject the multilayer chip to a hydrophilizing treatment so that the fired multilayer chip is conformable to a plating liquid. Also, it is preferable to subject the multilayer chip to an oil repellent treatment so as to prevent the plating layer from excessively wetting on the both lateral surfaces of the multilayer chip.

In this manner, the multilayer ceramic capacitor 10 according to a preferred embodiment of the present invention is produced.

Figure 9:
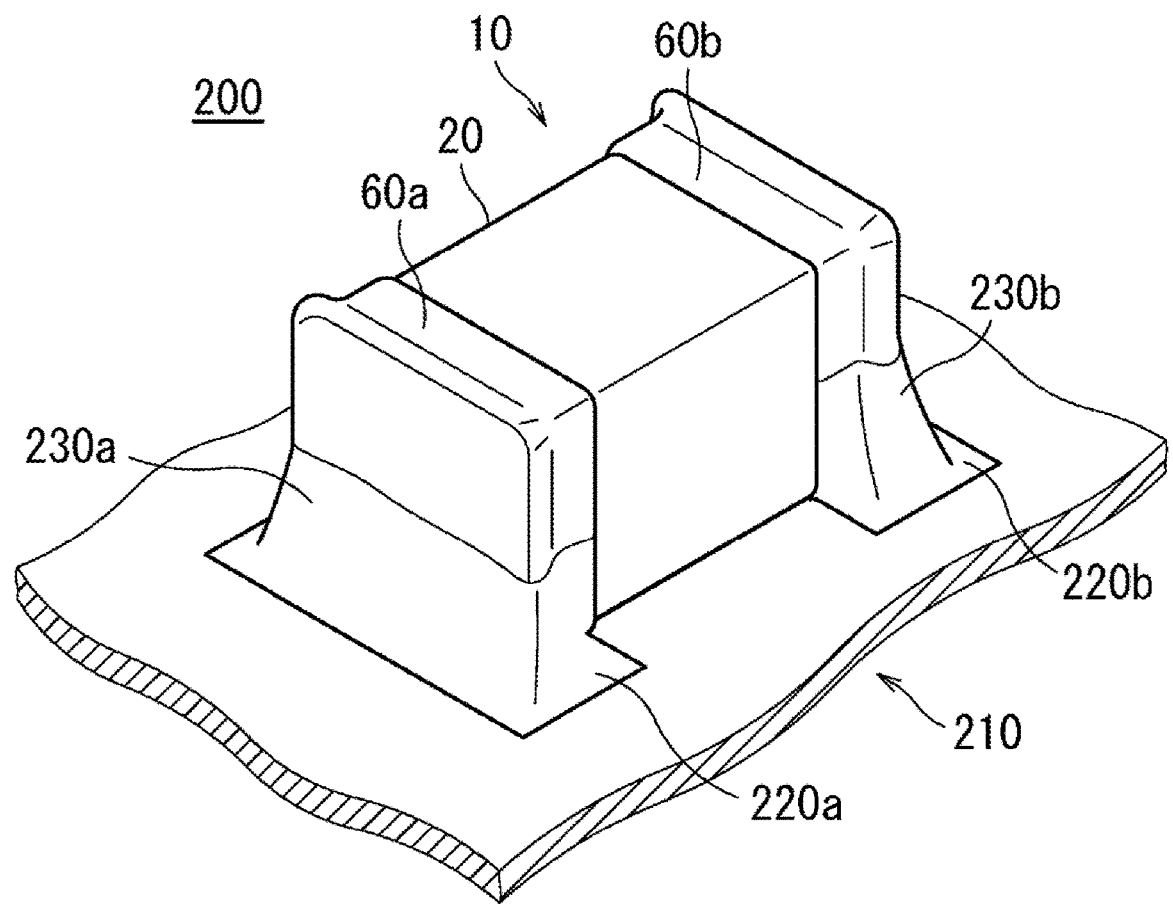
FIG. 9 is an external perspective view showing a mounting structure of a multilayer ceramic capacitor according to a preferred embodiment of the present invention.

Next, a mounting structure of the multilayer ceramic capacitor according to a preferred embodiment of the present invention is described by referring to FIG. 9. In this description, a case of mounting the multilayer ceramic capacitor 10 according to a preferred embodiment of the present invention to a mounting substrate 210 is described as an example. FIG. 9 is an external perspective view showing a mounting structure of the multilayer ceramic capacitor according to a preferred embodiment of the present invention.

A mounting structure 200 of the multilayer ceramic capacitor according to the present preferred embodiment includes the multilayer ceramic capacitor 10 according to a preferred embodiment of the present invention, and the mounting substrate 210 on which the multilayer ceramic capacitor 10 is mounted. The multilayer ceramic capacitor 10 is disposed so that the first external electrode 60a is in contact with a first land portion 220a on the mounting substrate 210, and the second external electrode 60b is in contact with a second land portion 220b on the mounting substrate 210. Then the first external electrode 60a and the first land portion 220a are joined by a first fillet 230a made of a solder so as to be electrically connected. Similarly, the second external electrode 60b and the second land portion 220b are joined by a second fillet 230b made of a solder so as to be electrically connected.

Hereinafter, experimental examples conducted by the inventors of preferred embodiments of the present invention to confirm the advantageous effects of the present invention are described.

In Experimental Example 1, samples (multilayer ceramic capacitors) of Examples 1 to 3 and Comparative Examples 1, 2 in which regarding the first internal electrode layer and the second internal electrode layer, a coverage in the central portion in the W direction, a coverage in the end portion in the W direction, and a coverage in the end portion in the L direction in the section along the plane where the W direction and the L direction intersect, and the shifting amount in the W direction are varied were produced. These samples were evaluated by conducting a moisture proof reliability test and an initial short circuit test.

Samples (multilayer ceramic capacitors) of Examples 1 to 3 and Comparative Examples 1, 2 were prepared according to the production method described above. Specifications that are common to every sample are as follows.

Dimension of multilayer ceramic capacitor (L dimension×W dimension×T dimension): about 0.68 mm×about 0.38 mm×about 0.38 mm Dielectric material: $BaTiO_3$ (about 0.4 parts by mol of Dy is included, about 0.4 parts by mol of Mn is included, about 1.0 parts by mol of Si is included, about 0.3 parts by mol of V is included, about 0.01 parts by mol of Al is included, and about 0.01 parts by mol of Zr is included, relative to 100 parts by mol of Ti.)

Internal electrode layer: Ni

Structure of external electrode

Baked layer: Cu

Plating layer: Ni plating layer and Sn plating layer

In the sample of Example 1, regarding the first internal electrode layer or the second internal electrode layer, the coverage in the central portion in the W direction (hereinafter, simply referred to as "coverage in the W direction central portion") was about 85%, the coverage within about 30.000 μm from the end portion in the W direction (hereinafter, simply referred to as "coverage in the W direction end portion") was about 90%, and the coverage within about 30.000 μm from the end portion in the L direction (hereinafter, simply referred to as "coverage in the L direction end portion") was about 80% in the section along the plane in which the W direction and the L direction intersect, and a shifting amount in the W direction was within about 5.000 μm.

In the sample of Example 2, regarding the first internal electrode layer or the second internal electrode layer, the coverage in the W direction central portion was about 85%, the coverage in the W direction end portion was about 90%, and the coverage in the L direction end portion was about 80% in the section along the plane in which the W direction and the L direction intersect, and a shifting amount in the W direction was within about 10.000 μm.

In the sample of Example 3, regarding the first internal electrode layer or the second internal electrode layer, the coverage in the W direction central portion was about 85%, the coverage in the W direction end portion was about 90%, and the coverage in the L direction end portion was about 80% in the section along the plane in which the W direction and the L direction intersect.

In the sample of Comparative Example 1, regarding the first internal electrode layer or the second internal electrode layer, the coverage in the W direction central portion was about 85%, the coverage in the W direction end portion was about 80%, and the coverage in the L direction end portion was about 80% in the section along the plane in which the W direction and the L direction intersect.

In the sample of Comparative Example 2, regarding the first internal electrode layer or the second internal electrode layer, the coverage in the W direction central portion was about 85%, the coverage in the W direction end portion was about 90%, and a coverage in the L direction end portion was about 90% in the section along the plane in which the W direction and the L direction intersect, and a shifting amount in the W direction was within about 10.008 μm.

Respective coverages of the samples described above were defined in the following manner. First, for each sample, the first lateral portion and the second lateral portion (namely, W gaps of both sides), and the first end portion or the second end portion (namely, L gap of either side) were removed by polishing. Next, the first internal electrode layer or the second internal electrode layer was electrolytically peeled off from the dielectric layer by using a solution, and the first internal electrode layer or the second internal electrode layer that had been located in the central portion in the T direction was exposed. For the exposed first internal electrode layer or second internal electrode layer, an observation site image was acquired by an optical microscope. Then for the portion to be observed in the acquired observation site image, under the microscope with 1000 magnification, a percentage of the area in which the first internal electrode layer or the second internal electrode layer actually exists, relative to the area of the entire one visual field was calculated as a detection region percentage. Regarding the observed visual field, for 5 chips, four planes were observed for the first internal electrode layer or the second internal electrode layer located in the central portion in the T direction, and five visual fields were selected for each plane, and a total of 100 visual fields were selected and observed. For each visual field, a detection region percentage was calculated, and a mean value of 100 visual fields was defined as a coverage.

A shifting amount in the W direction of each sample was calculated in the following manner. First, each sample was polished to the central portion of L dimension from the first end surface or the second end surface to expose the first internal electrode layer and the second internal electrode layer. Then, using a field emission scanning electron microscope (FE-SEM), an observation site image of the exposed first internal electrode layer and second internal electrode layer was acquired, and image analysis was conducted to calculate a shifting amount in the W direction.

In the test for evaluating the moisture proof reliability, a determination was made according to whether deterioration in a resistance (deterioration that a resistance rapidly drops relative to the initial value) occurred when a voltage corresponding to twice the rated voltage was applied to each sample for about 12 hours in the environment at a temperature of about 85° C., and a humidity of about 85%. Specifically, in the aforementioned environment, a voltage of about 12.6 V corresponding to twice a rated voltage of about 6.3 V was applied for about 12 hours, and a sample in which the resistance dropped to about 1/10 or less of the initial value, and a sample that failed to work were evaluated as no good. The first moisture proof reliability test was conducted respectively for 72 samples produced according to the production method described above.

In a test for evaluating an initial short circuit, an AC voltage (frequency 120 Hz, voltage about 0.5 V) was applied to each sample, measurement using a LCR meter was conducted, and when a log IR value was about 3.0Ω or less, it was determined that an initial short circuit occurred, and the sample was evaluated as no good. The initial short circuit test was conducted respectively for 100 samples produced according to the production method described above.

Results of Experimental example 1 are shown in Table 2.

TABLE 2

| Sample No. | | Coverage (%) W direction central portion | Coverage (%) W direction end portion | Coverage (%) L direction end portion | Upper limit of W direction shifting amount (μm) | Moisture proof reliability (Number of NG) Applied voltage 2.0 WV | Initial short circuit (Number of NG) |
|---|---|---|---|---|---|---|---|
| Example | 1 | 85 | 90 | 80 | 5.000 | 0/72 | 0/100 |
|  | 2 | 85 | 90 | 80 | 10.000 | 0/72 | 0/100 |
|  | 3 | 85 | 90 | 80 | — | 0/72 | — |
| Comparative Example | 1 | 85 | 80 | 80 | — | 3/72 | — |
|  | 2 | 85 | 90 | 90 | 10.008 | 0/72 | 2/100 |

As shown in Table 2, in each of Example 1 and Example 2, the number of samples evaluated as no good in the first moisture proof reliability test and the initial short circuit test was 0. On the other hand, in Comparative Example 1, the number of samples evaluated as no good in the first moisture proof reliability test was 3. In Comparative Example 2, the number of samples evaluated as no good in the first moisture proof reliability test was 0, but the number of samples evaluated as no good in the initial short circuit test was 2. These results confirm that by making the coverage in the W direction central portion lower than the coverage in the W direction end portion in the section along the plane where the W direction and the L direction intersect, and making the shifting amount in the W direction about 0.000 μm or more and about 10.000 μm or less regarding the first internal electrode layer or the second internal electrode layer, the moisture proof reliability in an actual use environment is improved, and an initial short circuit defect is reduced or prevented in the multilayer ceramic capacitors according to preferred embodiments of the present invention.

Additionally, a second moisture proof reliability test was conducted. The second moisture proof reliability test is different from the first moisture proof reliability test only in that a voltage corresponding to about 2.5 times the rated voltage is applied, and the remaining conditions are the same or substantially the same. Therefore, the same description is not repeated. Results of the second moisture proof reliability test are shown in Table 3.

TABLE 3

| Sample No. | | Coverage (%) W direction central portion | Coverage (%) W direction end portion | Coverage (%) L direction end portion | Moisture proof reliability (Number of NG) Applied voltage 2.5 WV |
|---|---|---|---|---|---|
| Example | 1 | 85 | 90 | 80 | 0/72 |
|  | 2 | 85 | 90 | 80 | 0/72 |
|  | 3 | 85 | 90 | 80 | 0/72 |
| Comparative Example | 1 | 85 | 80 | 80 | 23/72 |
|  | 2 | 85 | 90 | 90 | 30/72 |

As shown in Table 3, the number of samples evaluated as no good in the second moisture proof reliability test was 0 in Examples 1 to 3, and 23 in Comparative Example 1, and 30 in Comparative Example 2. Here, the sample of Comparative Example 2 has the coverage in the W direction central portion that is lower than the coverage in the W direction end portion, and thus is the same as the samples of Examples 1 to 3 in this manner. However, the sample of Comparative Example 2 has the coverage in the L direction end portion that is the same as the coverage in the W direction end portion, and thus, is different from the samples of Examples 1 to 3 in this manner. These experimental results confirm that the moisture proof reliability of the multilayer ceramic capacitors according to preferred embodiments of the present invention is further improved by making the coverage in the L direction end portion lower than the coverage in the W direction end portion in the section along the plane where the W direction and the L direction intersect.

Hereinafter, Reference Experimental Examples produced by the inventors of preferred embodiments of the present invention are described.

In Reference Experimental Example 1, samples (multilayer ceramic capacitors) of Reference Examples 1 to 7 in which regarding the Ni—Sn reaction layer at the boundary between the first internal electrode layer and the second internal electrode layer, and the dielectric layer, the continuity and the thickness in the section along the plane in which the T direction and the W direction intersect are varied, and the Mg segregation amount (elemental ratio Mg/Ni) of the internal electrode layer located closest to the outer layer side (internal electrode layer of the outermost layer portion) is varied were produced. These samples were evaluated by conducting a high temperature reliability test.

Samples (multilayer ceramic capacitors) of Reference Examples 1 to 7 were prepared according to the production method described above. Since specifications that are common to every sample are the same as those of the Experimental Example 1 described above, the description thereof is not repeated here.

In the sample of Reference Example 1, regarding the Ni—Sn reaction layer at the boundary between the first internal electrode layer and the second internal electrode layer, and the dielectric layer, the continuity in the section along the plane in which the T direction and the W direction intersect was about 50.0% of the W dimension of each of the first internal electrode layer and the second internal electrode layer, and the thickness was about 5 nm. In the sample of Reference Example 1, the Mg segregation amount (elemental ratio Mg/Ni) of the internal electrode layer located closest to the outer layer side was about 0.03.

In the sample of Reference Example 2, regarding the Ni—Sn reaction layer at the boundary between the first internal electrode layer and the second internal electrode layer, and the dielectric layer, the continuity in the section along the plane where the T direction and the W direction intersect was about 50.0% of the W dimension of each of the first internal electrode layer and the second internal electrode layer, and the thickness was about 20 nm. In the sample of Reference Example 2, the Mg segregation amount (elemental ratio Mg/Ni) of the internal electrode layer located closest to the outer layer side was about 0.05.

In the sample of Reference Example 3, regarding the Ni—Sn reaction layer at the boundary between the first internal electrode layer and the second internal electrode layer, and the dielectric layer, the continuity in the section along the plane in which the T direction and the W direction intersect was about 100.0% of the W dimension of each of the first internal electrode layer and the second internal electrode layer, and the thickness was about 5 nm. In the sample of Reference Example 3, the Mg segregation amount (elemental ratio Mg/Ni) of the internal electrode layer located closest to the outer layer side was about 0.04.

In the sample of Reference Example 4, regarding the Ni—Sn reaction layer at the boundary between the first internal electrode layer and the second internal electrode layer, and the dielectric layer, the continuity in the section along the plane in which the T direction and the W direction intersect was about 100.0% of the W dimension of the first internal electrode layer and the second internal electrode layer, and the thickness was about 20 nm.

In the sample of Reference Example 5, regarding the Ni—Sn reaction layer at the boundary between the first internal electrode layer and the second internal electrode layer, and the dielectric layer, the continuity in the section along the plane in which the T direction and the W direction intersect was about 75.0% of the W dimension of each of the first internal electrode layer and the second internal electrode layer, and the thickness was about 4 nm. In the sample of Reference Example 5, the Mg segregation amount (elemental ratio Mg/Ni) of the internal electrode layer located closest to the outer layer side was about 0.06.

In the sample of Reference Example 6, regarding the Ni—Sn reaction layer at the boundary between the first internal electrode layer and the second internal electrode layer, and the dielectric layer, the continuity in the section along the plane in which the T direction and the W direction intersect was about 75.0% of the W dimension of each of the first internal electrode layer and the second internal electrode layer, and the thickness was about 21 nm. In the sample of Reference Example 6, the Mg segregation amount (elemental ratio Mg/Ni) of the internal electrode layer located closest to the outer layer side was about 0.04.

In the sample of Reference Example 7, regarding the Ni—Sn reaction layer at the boundary between the first internal electrode layer and the second internal electrode layer, and the dielectric layer, the continuity in the section along the plane in which the T direction and the W direction intersect was about 49.5% of the W dimension of each of the first internal electrode layer and the second internal electrode layer, and the thickness was about 10 nm. In the sample of Reference Example 7, the Mg segregation amount (elemental ratio Mg/Ni) of the internal electrode layer located closest to the outer layer side was about 0.04.

A method for quantifying the continuity and the thickness of the Ni—Sn reaction layer is described. First, the multilayer ceramic capacitor was polished to the central portion of the L dimension from the first end surface or the second end surface to expose a WT section. Next, the exposed WT section was sliced by ion beam process (FIB). Further, in the central portion in the T direction of the sliced WT section, 20 visual fields were randomly selected along the W direction, and element distribution mapping observation was conducted for each of the selected visual fields using a scanning transmission electron microscope-energy dispersive X-ray spectroscope (STEM-EDS). In this manner, the continuity and the thickness of the Ni—Sn reaction layer were quantified.

Segregation of Mg in the internal electrode layer that is located closest to the outer layer side was confirmed in the following manner. Each sample was polished to the position of about ½ in the L direction from the first end surface or the second end surface to expose the first internal electrode layer and the second internal electrode layer. Next, to confirm the segregation of Mg in the internal electrode layer that is located closest to the outer layer side among the plurality of internal electrode layers, 100 visual fields were randomly selected in the internal electrode layer of the exposed WT section. Then the selected 100 visual fields were observed using a scanning electron microscope. For each visual field, a spectrum was acquired using the scanning electron microscope, and an elemental ratio Mg/Ni was calculated. The elemental ratio Mg/Ni was a mean value of 100 points of elemental ratio of each visual field.

In the test to evaluate the high temperature reliability, determination was made according to whether deterioration in a resistance (deterioration that a resistance rapidly drops relative to the initial value) occurred when a rated voltage (set at about 6.3 V herein) was applied to each sample for about 2000 hours in an environment at a temperature of about 85° C. Here, a sample in which the resistance failed to decrease to about one ten-thousandth or less was evaluated as good (G), and a sample in which the resistance dropped to about one ten-thousandth or less or a sample failed to operate were evaluated as no good NG). The high temperature reliability test was conducted for 72 samples produced according to the production method described above.

Additionally, a test to evaluate moisture proof reliability was conducted. In the test to evaluate the moisture proof reliability, determination was made according to whether deterioration in a resistance (deterioration that a resistance rapidly drops relative to the initial value) occurred when a voltage corresponding to twice the rated voltage (set at about 6.3 V herein) (that is, about 12.6V) was applied to each sample for about 12 hours in the environment at a temperature of about 85° C., and a humidity of about 85%. Here, a sample in which the resistance failed to decrease to about 1/10 or less was evaluated as good (G), and a sample in which the resistance dropped to about 1/10 or less or a sample failed to operate were evaluated as no good (NG). The moisture proof reliability test was conducted for 72 samples produced according to the production method described above.

Results of the high temperature reliability test of Reference Experimental Example 1 are shown in Table 4.

TABLE 4

| Sample No. | | Ni—Sn reaction layer | | High temperature reliability |
|---|---|---|---|---|
| | | Continuity (%) | Thickness (nm) | |
| Reference example | 1 | 50.0 | 5 | G |
| | 2 | 50.0 | 20 | G |
| | 3 | 100.0 | 5 | G |
| | 4 | 100.0 | 20 | G |
| | 5 | 75.0 | 4 | NG |
| | 6 | 75.0 | 21 | NG |
| | 7 | 49.5 | 10 | NG |

As shown in Table 4, all of the samples of Reference Examples 1 to 4 were evaluated as good (G).

On the other hand, all of the samples of Reference Examples 5 to 7 were evaluated as no good (NG). The case including no no-good sample in 72 samples was determined as good (G), and the case including only one no good sample in 72 samples was determined as no good (NG). These results confirmed that the high temperature load life of the multilayer ceramic capacitor is improved by making the continuity in the section along the plane where the T direction and the W intersect about 50.0% or more and about 100.0% or less of the W dimension of each of the first internal electrode layer and the second internal electrode layer, and making the thickness about 5 nm or more and about 20 nm or less, regarding the Ni—Sn reaction layer at the boundary between the first internal electrode layer and the second internal electrode layer, and the dielectric layer.

Results of the moisture proof reliability test of Reference Experimental Example 1 are shown in Table 5.

TABLE 5

| Sample No. | | Mg segregation in outermost layer portion (Mg/Ni) | Moisture proof reliability |
|---|---|---|---|
| Reference example | 1 | 0.03 | G |
| | 2 | 0.05 | G |
| | 3 | 0.04 | G |
| | 4 | — | G |
| | 5 | 0.06 | NG |
| | 6 | 0.04 | G |
| | 7 | 0.04 | G |

As shown in Table 5, the samples of Reference Examples 1 to 4, 6 and 7 were evaluated as good (G). On the other hand, only the sample of Reference Example 5 was evaluated as no good (NG). The case including no no-good sample in 72 samples was determined as good (G), and the case including only one no good sample in 72 samples was determined as no good (NG). These results confirmed that the moisture proof reliability is improved because the Mg segregation amount of each of the first internal electrode layer or the second internal electrode layer that is located closest to the outer layer side is about 0.05 or less by elemental ratio Mg/Ni.

In Reference Experimental Example 2, samples (multilayer ceramic capacitors) of Reference Examples 1 to 3 and Reference Examples 5 to 10 in which the presence or absence of Mg segregating in the portion adjacent to the dielectric layer of each of the plurality of internal electrode layers of the multilayer ceramic capacitor, and the segregation amount of Mg of the internal electrode layer that is located closest to the outer layer side (internal electrode layer of the outermost layer portion) are varied were produced. These samples were evaluated by conducting a high temperature reliability test and an initial short circuit test.

Samples (multilayer ceramic capacitors) of Reference Examples 1 to 3, Reference Examples 5 to 10 and Reference Example 15 were prepared according to the production method described above. Since specifications that are common to every sample are the same as those of the Experimental Example 1 described above, the description thereof is not repeated here.

The sample of Reference Example 1 has segregation of Mg in the portion adjacent to the dielectric layer of each of the plurality of internal electrode layers, and segregation of Mg in the internal electrode layer that is located closest to the outer layer side is about 0.03 by elemental ratio Ni/Mg, Ni—Mg—Mn—O glass segregates in the end portion in the W direction of the internal electrode layer, and the dimension along the width direction of the region where Ni—Mg—Mn—O glass segregates is about 0.500 μm.

The sample of Reference Example 2 has segregation of Mg in the portion adjacent to the dielectric layer of each of the plurality of internal electrode layers, and segregation of Mg in the internal electrode layer that is located closest to the outer layer side is about 0.05 by elemental ratio Ni/Mg, Ni—Mg—Mn—O glass segregates in the end portion in the W direction of the internal electrode layer, and the dimension along the width direction of the region in which Ni—Mg—Mn—O glass segregates is about 0.500 μm.

The sample of Reference Example 3 has segregation of Mg in the portion adjacent to the dielectric layer of each of the plurality of internal electrode layers, and segregation of Mg in the internal electrode layer that is located closest to the outer layer side is about 0.04 by elemental ratio Ni/Mg, Ni—Mg—Mn—O glass segregates in the end portion in the W direction of the internal electrode layer, and the dimension along the width direction of the region in which Ni—Mg—Mn—O glass segregates is about 1.000 μm.

The sample of Reference Example 5 has segregation of Mg in the portion adjacent to the dielectric layer of each of the plurality of internal electrode layers, and segregation of Mg in the internal electrode layer that is located closest to the outer layer side is about 0.06 by elemental ratio Ni/Mg, Ni—Mg—Mn—O glass segregates in the end portion in the W direction of the internal electrode layer, and the dimension along the width direction of the region in which Ni—Mg—Mn—O glass segregates is about 0.500 μm.

The sample of Reference Example 6 has segregation of Mg in the portion adjacent to the dielectric layer of each of the plurality of internal electrode layers, and segregation of Mg in the internal electrode layer that is located closest to the outer layer side is about 0.04 by elemental ratio Ni/Mg, Ni—Mg—Mn—O glass segregates in the end portion in the W direction of the internal electrode layer, and the dimension along the width direction of the region in which Ni—Mg—Mn—O glass segregates is about 1.050 μm.

The sample of Reference Example 7 has segregation of Mg in the portion adjacent to the dielectric layer of each of the plurality of internal electrode layers, and segregation of Mg in the internal electrode layer that is located closest to the outer layer side is about 0.04 by elemental ratio Ni/Mg, Ni—Mn—O glass segregates in the end portion in the W direction of the internal electrode layer, and the dimension along the width direction of the region in which Ni—Mn—O glass segregates is about 0.500 μm.

The sample of Reference Example 8 has segregation of Mg in the portion adjacent to the dielectric layer of each of the plurality of internal electrode layers, and segregation of Mg in the internal electrode layer that is located closest to the outer layer side is about 0.04 by elemental ratio Ni/Mg, Mg—Mn—O glass segregates in the end portion in the W direction of the internal electrode layer, and the dimension along the width direction of the region in which Mg—Mn—O glass segregates is about 0.500 μm.

The sample of Reference Example 9 has segregation of Mg in the portion adjacent to the dielectric layer of each of the plurality of internal electrode layers, and segregation of Mg in the internal electrode layer that is located closest to the outer layer side is about 0.04 by elemental ratio Ni/Mg, Ni—Mg—O glass segregates in the end portion in the W direction of the internal electrode layer, and the dimension along the width direction of the region in which Ni—Mg—O glass segregates is about 0.500 μm.

The sample of Reference Example 10 has segregation of Mg in the portion adjacent to the dielectric layer of each of the plurality of internal electrode layers, and segregation of Mg in the internal electrode layer that is located closest to the outer layer side was about 0.04 by elemental ratio Ni/Mg. However, segregation of glass was not observed in the end portion in the W direction of the internal electrode layer.

The sample of Reference Example 15 does not have segregation of Mg in the portion adjacent to the dielectric layer of each of the plurality of internal electrode layers, and segregation of Mg in the internal electrode layer that is located closest to the outer layer side is about 0.05 by elemental ratio Ni/Mg, Ni—Mg—Mn—O glass segregates in the end portion in the W direction of the internal electrode layer, and the dimension along the width direction of the region in which Ni—Mg—Mn—O glass segregates is about 0.500 μm.

Segregation of Mg was confirmed in the same or substantially the same manner as in Reference Experimental Example 1, and thus, the description is not repeated.

Confirmation of the region in which glass (Ni—Mg—Mn—O glass, Ni—Mn—O glass, Mg—Mn—O glass, Ni—Mg—O glass) segregates, and measurement of the dimension along the W direction of the region were conducted in the following manner. First, each sample was polished along the L direction to expose a WT section. Next, using a scanning electron microscope (FE-WDX), a spectrum of the internal electrode layer located near the central portion of the exposed WT section was acquired, and a region in which glass segregates was identified. Then, the dimension along the W direction of the region in which glass segregates was quantified by mapping analysis. The dimension was calculated by randomly selecting 100 points of end portions in the W direction of the internal electrode layer in the exposed WT section, and determining a mean value of the dimension along the W direction of the region where glass segregates, measured for the selected 100 points. The end portion in the W direction of the internal electrode layer means within about 30.000 μm from an end portion in the W direction of the first internal electrode layer 50a or the second internal electrode layer 50b.

In the test to evaluate the high temperature reliability, a rated voltage (set at about 6.3 V herein) was applied to each sample for about 2000 hours in an environment at a temperature of about 85° C., and when deterioration in a resistance occurred (when the resistance rapidly dropped relative to the initial value, more specifically, when the resistance reduced to the fourth power or less) only once, it was determined that the high temperature reliability is insufficient, and it was evaluated that the sample is no good. The high temperature reliability test was conducted for 72 samples produced according to the production method described above.

In a test to evaluate initial short circuit, an AC voltage (frequency 120 Hz, voltage 0.5 V) was applied to each sample, measurement using a LCR meter was conducted, and when the log IR value was about 3.0Ω or less, it was determined that initial short circuit occurred, and the sample was evaluated as no good. The initial short circuit test was conducted for 100 samples produced according to the production method described above.

Results of Reference Experimental Example 2 are shown in Table 6.

TABLE 6

| Sample No. | | Presence or absence of Mg segregation in inner layer portion | Mg segregation in outermost layer portion (Mg/Ni) | Glass composition | Length in W direction of glass (μm) | High temperature reliability (Number of NG) | Initial short circuit (Number of NG) |
|---|---|---|---|---|---|---|---|
| Reference example | 1 | Present | 0.03 | Ni—Mg—Mn—O | 0.500 | 0/72 | 0/100 |
| | 2 | Present | 0.05 | Ni—Mg—Mn—O | 0.500 | 0/72 | 0/100 |
| | 3 | Present | 0.04 | Ni—Mg—Mn—O | 1.000 | 0/72 | 0/100 |
| | 5 | Present | 0.06 | Ni—Mg—Mn—O | 0.500 | 4/72 | 0/100 |
| | 6 | Present | 0.04 | Ni—Mg—Mn—O | 1.050 | 1/72 | 2/100 |
| | 7 | Present | 0.04 | Ni—Mn—O | 0.500 | 1/72 | 3/100 |
| | 8 | Present | 0.04 | Mg—Mn—O | 0.500 | 0/72 | 3/100 |
| | 9 | Present | 0.04 | Ni—Mg—O | 0.500 | 0/72 | 8/100 |
| | 10 | Present | 0.04 | — | — | 0/72 | 10/100 |
| | 15 | Absent | 0.05 | Ni—Mg—Mn—O | 0.500 | 70/72 | 95/100 |

As shown in Table 6, the number of samples evaluated as no good in high temperature reliability was 0 in each of Reference Examples 1 to 3 and Reference Examples 8 to 10, and the number of samples evaluated as no good in high temperature reliability was 1 in each of Reference Example 6 and Reference Example 7. On the other hand, the number of samples evaluated as no good in high temperature reliability was 4 in Reference Example 5, and was 70 in Reference Example 15. These results confirmed that the high temperature reliability is improved in the samples (multilayer ceramic capacitors) of Reference Examples 1 to 3 and Reference Examples 6 to 10.

In addition, as shown in Table 6, in Reference Examples 1 to 3, Ni—Mg—Mn—O glass segregated in the end portion in the W direction of the internal electrode layer, and when the dimension along the W direction of the region in which Ni—Mg—Mn—O glass segregated was respectively 1.000 μm or less, the number of samples evaluated as no good in the initial short circuit test was 0 in any case. On the other hand, the number of samples evaluated as no good in the initial short circuit test was 0 in Reference Example 5, but was 95 in Reference Example 15. These results confirmed that the samples (multilayer ceramic capacitor) of Reference Examples 1 to 3 have high temperature reliability, and initial short circuit defects are reduced or prevented in these samples.

Figure 10:
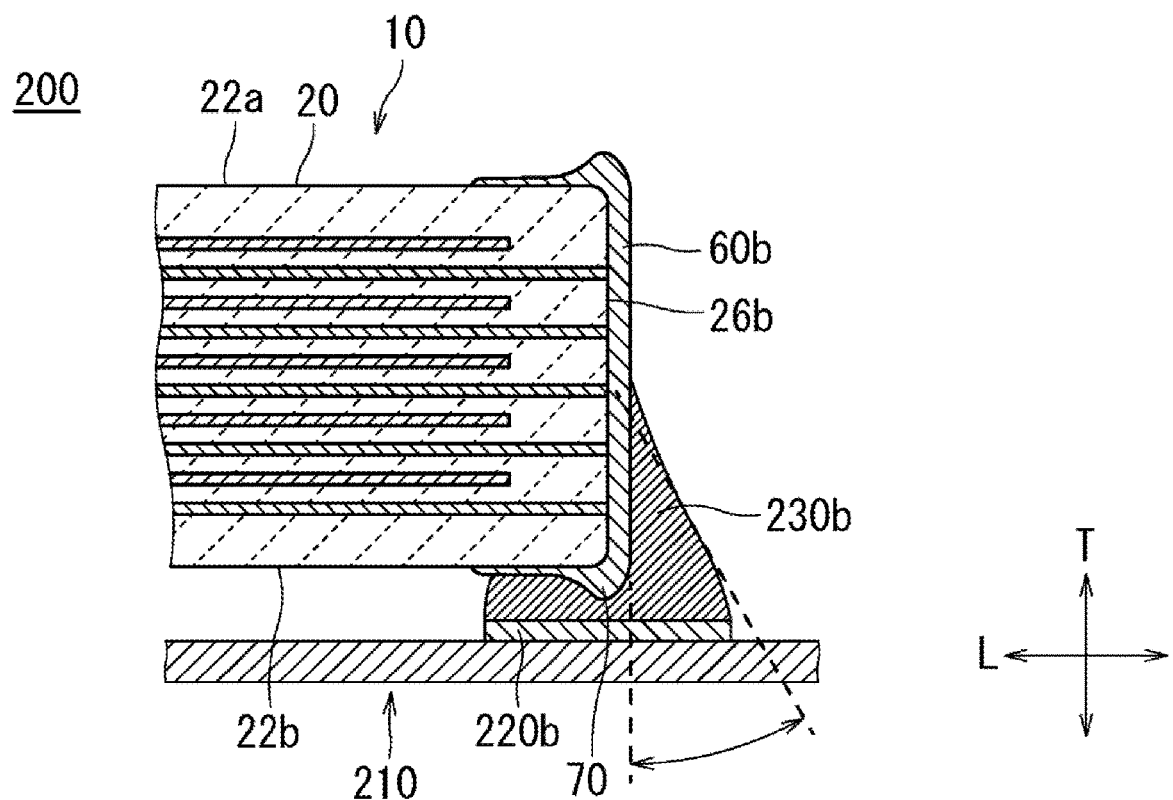
FIG. 10 is an enlarged section view showing a desired solder wetting structure in the mounting structure of a multilayer ceramic capacitor according to a preferred embodiment of the present invention.
Figure 11:
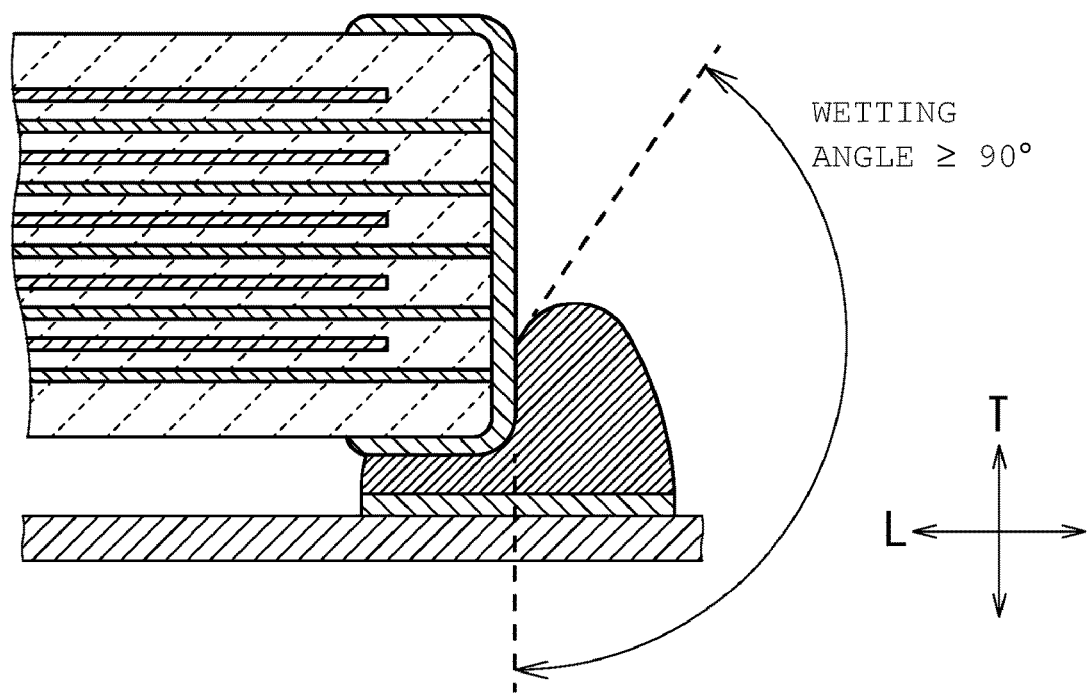
FIG. 11 is an enlarged section view showing an undesired solder wetting structure in which solder wetting angle is 90° or more.

In Reference Experimental Example 3, description is provided with reference to FIG. 5A, 5B, FIG. 10, and FIG. 11. FIG. 10 is an enlarged section view showing a preferable solder wetting structure in the mounting structure of the multilayer ceramic capacitor according to a preferred embodiment of the present invention. FIG. 11 is an enlarged section view showing an undesired solder wetting structure in which solder wetting angle is about 90° or more.

In Reference Experimental Example 3, referring to FIGS. 5A and 5B, samples (multilayer ceramic capacitors) according to Reference Examples 1 to 3 and Reference Examples 5 to 10 in which, regarding the protruding portion of the baked layer of the first external electrode and the second external electrode, $t_1$ and $d_1/e_1$ regarding the protruding portion provided on the second principal surface side of the first external electrode, and the T dimension of the multilayer ceramic capacitor are varied were prepared. In the sample of Reference Example 8, a protruding portion is not provided. Respectively 100 samples were prepared, and evaluated by testing the fixing strength with a substrate on which the sample is mounted, and the solder wettability.

Samples (multilayer ceramic capacitors) of Reference Examples 1 to 3, Reference Examples 5 to 10 and Reference Examples 12 to 14 were prepared according to the production method described above. Since specifications that are common to every sample are the same as those of the Experimental example 1 described above expect for the dimension of the multilayer ceramic capacitor, the description thereof is not repeated here.

In the sample of Reference Example 1, regarding the portion provided on the second principal surface side of the baked layer of the first external electrode, the dimension $t_1$ was about 0.5000 μm, and the $d_1/e_1$ was about 1.0035. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 2, regarding the portion provided on the second principal surface side of the baked layer of the first external electrode, the dimension $t_1$ was about 10.000 μm, and the $d_1/e_1$ was about 1.1500. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 3, regarding the portion provided on the second principal surface side of the baked layer of the first external electrode, the dimension $t_1$ was about 35.000 μm, and the $d_1/e_1$ was about 1.4000. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 5, regarding the portion provided on the second principal surface side of the baked layer of the first external electrode, the dimension $t_1$ was about 0.496 μm, and the $d_1/e_1$ was about 1.0001. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 6, regarding the portion provided on the second principal surface side of the baked layer of the first external electrode, the dimension $t_1$ was about 36.000 μm, and the $d_1/e_1$ was about 1.4100. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 7, regarding the portion provided on the second principal surface side of the baked layer of the first external electrode, the dimension $t_1$ was about 35.5 μm, and the $d_1/e_1$ was about 1.4050. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 8, a protruding portion was not provided as described above. The $d_1/e_1$ was about 1.0040. The same applies to the second external electrode. Further, the L dimension×W dimension of the multilayer ceramic capacitor was about 0.68 mm×about 0.38 mm. The T dimension of the multilayer ceramic capacitor was about 0.38 mm.

In the sample of Reference Example 9, regarding the portion provided on the second principal surface side of the baked layer of the first external electrode, the dimension $t_1$ was about 0.500 μm, and the $d_1/e_1$ was about 1.0050. The same applied to the dimension $t_2$ of the baked layer of the second external electrode and the $d_2/e_2$. Further, the L dimension×W dimension of the multilayer ceramic capacitor was about 0.4 mm×about 0.2 mm. The T dimension of the multilayer ceramic capacitor was about 0.15 mm.

In the sample of Reference Example 10, regarding the portion provided on the second principal surface side of the baked layer of the first external electrode, the dimension $t_1$ was about 10.000 μm, and the $d_1/e_1$ was about 1.150. The same applied to the dimension $t_2$ of the baked layer of the second external electrode and the $d_2/e_2$. Further, the L dimension×W dimension of the multilayer ceramic capacitor was about 0.4 mm×about 0.2 mm. The T dimension of the multilayer ceramic capacitor was about 0.11 mm.

In the sample of Reference Example 12, regarding the portion provided on the second principal surface side of the baked layer of the first external electrode, the dimension $t_1$ was about 0.500 μm, and the $d_1/e_1$ was about 1.0045. The same applied to the dimension $t_2$ of the baked layer of the second external electrode and the $d_2/e_2$. Further, the L dimension×W dimension of the multilayer ceramic capacitor was about 0.68 mm×about 0.38 mm. The T dimension of the multilayer ceramic capacitor was about 0.38 mm.

In the sample of Reference Example 13, regarding the portion provided on the second principal surface side of the baked layer of the first external electrode, the dimension $t_1$ was about 15.000 μm, and the $d_1/e_1$ was about 1.2000. The same applied to the dimension $t_2$ of the baked layer of the second external electrode and the $d_2/e_2$. Further, the L dimension×W dimension of the multilayer ceramic capacitor was about 1.2 mm×about 0.7 mm. The T dimension of the multilayer ceramic capacitor was about 0.7 mm.

In the sample of Reference Example 14, regarding the portion provided on the second principal surface side of the baked layer of the first external electrode, the dimension $t_1$ was about 35.000 μm, and the $d_1/e_1$ was about 1.4000. The same applied to the dimension $t_2$ of the baked layer of the second external electrode and the $d_2/e_2$. Further, the L dimension×W dimension of the multilayer ceramic capacitor was about 0.4 mm×about 0.2 mm. The T dimension of the multilayer ceramic capacitor was about 0.18 mm.

First, each sample (multilayer ceramic capacitor) was polished to about ½ of the thickness in the W direction of the multilayer ceramic capacitor along the W direction, to expose an LT section. Next, using a field emission scanning electron microscope (FE-SEM), dimension $t_1$ in the protruding portion of the first external electrode was measured in the exposed LT section. In this case, in each sample, dimension $t_1$ in the protruding portion was measured for 100 multilayer ceramic capacitors, and a mean value was determined as dimension $t_1$ of the protruding portion. Also for $d_1/e_1$, measurement was conducted in the same manner as for dimension $t_1$, and a mean value was calculated.

Then for each sample (multilayer ceramic capacitor), the sample was mounted on a substrate, and then a force above a certain level along the W direction was applied to the sample (multilayer ceramic capacitor) from the first lateral surface or the second lateral surface, and fixing strength with the substrate was measured and evaluated. In this case, when all of the 100 samples did not come off the substrate even under application of a force of about 5.0 N, the sample was determined as good (G) in fixing strength with a substrate. Further, when all the 100 samples did not come off the substrate even under application of a force of about 6.0 N, the sample was determined as very good (VG) in fixing strength with a substrate. On the other hand, when only one sample came off the substrate under application of a force of about 5.0 N, the sample was determined as no good (NG) in the fixing strength with a substrate. When the element assembly side was broken under application of a force of about 5.0 N because of poor strength of the element assembly, the sample was determined as unmeasurable.

Also, the presence of solder wettability was evaluated. In this case, when solder wettability was present, the sample was determined as good (G), and when solder wettability was absent, namely the case of dewetting, the sample was determined as no good (NG). Specifically, as shown in FIG. 10, when the solder wetting angle was less than about 90°, the sample was determined as good (G). Also, as shown in FIG. 11, when the solder wetting angle was about 90° or more, the sample was determined as no good (NG).

Results of Reference experimental example 3 are shown in Table 7.

TABLE 7

| Sample No. | | $t_1$ (μm) | $d_1/e_1$ | Dimension of multilayer ceramic capacitor | | Fixing strength with substrate | Solder wettability |
|---|---|---|---|---|---|---|---|
| | | | | L dimension × W dimension | T dimension | | |
| Reference example | 1 | 0.500 | 1.0035 | 0.68 mm × 0.38 mm | 0.38 mm | G | G |
| | 2 | 10.000 | 1.1500 | 0.68 mm × 0.38 mm | 0.38 mm | VG | G |
| | 3 | 35.000 | 1.4000 | 0.68 mm × 0.38 mm | 0.38 mm | VG | G |
| | 5 | 0.496 | 1.0001 | 0.68 mm × 0.38 mm | 0.38 mm | NG | G |

TABLE 7-continued

| Sample No. | $t_1$ (μm) | $d_1/e_1$ | Dimension of multilayer ceramic capacitor | | Fixing strength with substrate | Solder wettability |
|---|---|---|---|---|---|---|
| | | | L dimension × W dimension | T dimension | | |
| 6 | 36.000 | 1.4100 | 0.68 mm × 0.38 mm | 0.38 mm | NG | NG |
| 7 | 35.5 | 1.4050 | 0.68 mm × 0.38 mm | 0.38 mm | NG | NG |
| 8 | No protruding portion | 1.0040 | 0.68 mm × 0.38 mm | 0.38 mm | NG | G |
| 9 | 0.500 | 1.0050 | 0.4 mm × 0.2 mm | 0.15 mm | Unmeasurable | G |
| 10 | 10.000 | 1.1500 | 0.4 mm × 0.2 mm | 0.11 mm | Unmeasurable | G |
| 12 | 0.500 | 1.0045 | 0.68 mm × 0.38 mm | 0.38 mm | VG | G |
| 13 | 15.000 | 1.2000 | 1.2 mm × 0.7 mm | 0.7 mm | VG | G |
| 14 | 35.000 | 1.4000 | 0.4 mm × 0.2 mm | 0.18 mm | VG | G |

As shown in Table 7, in Reference Example 1, the fixing strength with a substrate was good, and the solder wettability was also good. In Reference Example 2, Reference Example 3, and Reference Examples 12 to 14, the fixing strength with a substrate was very good, and the solder wettability was also good. On the other hand, in Reference Examples 5 to 8, the fixing strength with a substrate was no good, and also in Reference Example 6 and Reference Example 7, the solder wettability was no good. In Reference Example 9 and Reference Example 10, the element assembly side was broken because of poor strength of the element assembly, and the mountability was unmeasurable.

These results confirmed that when $t_1$ is Results of Reference experimental example 3 are shown in Table about 0.5 μm or more and about 35 μm or less, and the T dimension of the multilayer ceramic capacitor is about 0.18 mm or more and about 0.70 mm or less, the fixing strength with a substrate is very good or good, and the solder wettability is good. That is, it was confirmed that the multilayer ceramic capacitor as described above has improved mountability with a substrate. Further, it was confirmed that when $d_1/e_1$ is about 1.0045 or more and about 1.4 or less, the fixing strength with a substrate is very good.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate having a rectangular or substantially rectangular parallelepiped shape and including a plurality of dielectric layers, a plurality of first internal electrode layers, a plurality of second internal electrode layers that are alternately laminated in a laminating direction, the laminate including a first principal surface and a second principal surface that are opposite to each other in the laminating direction, a first lateral surface and a second lateral surface that are opposite to each other in a width direction that is perpendicular or substantially perpendicular to the laminating direction, and a first end surface and a second end surface that are opposite to each other in a length direction that is perpendicular or substantially perpendicular to the laminating direction and the width direction;
a first external electrode that is electrically connected with the plurality of first internal electrode layers and provided on the first end surface; and
a second external electrode that is electrically connected with the plurality of second internal electrode layers and provided on the second end surface; wherein
the plurality of first internal electrode layers or the plurality of second internal electrode layers define a coverage area in a central portion in the width direction less than a coverage area within about 30.000 μm from an end portion of the first and second internal electrode layers in the width direction;
the plurality of first internal electrode layers or the plurality of second internal electrode layers define a shifting amount in the width direction of about 0.000 μm or more and about 10.000 μm or less; and
a Mg segregation amount of each of the plurality of first internal electrode layers or each of the plurality of second internal electrode layers located closest to an outer layer side is expressed by an elemental ratio Mg/Ni of about 0.05 or less.

2. The multilayer ceramic capacitor according to claim 1, wherein
in the plurality of first internal electrode layers, a coverage area within about 30.000 μm from an end portion of each of the plurality of first internal electrode layers in the length direction, the end portion thereof not being connected with the first external electrode, is less than a coverage area within which is about 30.000 μm from an end portion of each of the plurality of first internal electrode layers in the width direction; and
in the plurality of second internal electrode layers, a coverage area within about 30.000 μm from an end portion of each of the plurality second internal electrode layers in the length direction, the end portion not being connected with the second external electrode, is less than a coverage area within about 30.000 μm from an end portion of each of the plurality of second internal electrode layers in the width direction.

3. The multilayer ceramic capacitor according to claim 1, wherein
each of the plurality of first internal electrode layers and the plurality of second internal electrode layers includes Ni;
a Ni—Sn reaction layer is provided at a boundary between the plurality of first internal electrode layers and the plurality of dielectric layers, and a boundary between the plurality of second internal electrode layers and the plurality of dielectric layers; and
the Ni—Sn reaction layer is continuously provided linearly to define a length of about 50.0% or more and about 100.0% or less of a width dimension of the plurality of first internal electrode layers and the plurality of second internal electrode layers; and
the Ni—Sn reaction layer has a thickness of about 5 nm or more and about 20 nm or less.

4. The multilayer ceramic capacitor according to claim 1, wherein Mg is segregated in a portion of each of the plurality of first internal electrode layers and the plurality of second internal electrode layers, the portion being adjacent to the dielectric layer.

5. The multilayer ceramic capacitor according to claim 1, wherein
a dimension in the laminating direction is about 0.300 mm±about 0.090 mm;
a dimension in the width direction is about 0.300 mm±about 0.090 mm;
a dimension in the length direction is about 0.600 mm±about 0.090 mm;
each of the plurality of dielectric layers has a thickness of about 0.48 μm±about 0.10 μm; and
a number of the plurality of dielectric layers is about 100 or more and about 500 or less.

6. The multilayer ceramic capacitor according to claim 1, wherein
a dimension in the laminating direction is about 0.200 mm±about 0.050 mm;
a dimension in the width direction is about 0.200 mm±about 0.050 mm;
a dimension in the length direction is about 0.400 mm±about 0.050 mm;
each of the plurality of dielectric layers has a thickness of about 0.48 μm±about 0.10 μm; and
a number of the plurality of dielectric layers is about 50 or more and about 300 or less.

7. The multilayer ceramic capacitor according to claim 1, wherein
a dimension in the laminating direction is about 0.300 mm±about 0.050 mm;
a dimension in the width direction is about 0.200 mm±about 0.050 mm;
a dimension in the length direction is about 0.400 mm±about 0.050 mm;
each of the plurality of dielectric layer has a thickness of about 0.48 μm±about 0.10 μm; and
a number of the plurality of dielectric layers is about 100 or more and about 500 or less.

8. The multilayer ceramic capacitor according to claim 1, wherein
a dimension in the laminating direction is about 0.300 mm±about 0.050 mm;
a dimension in the width direction is about 0.300 mm±about 0.050 mm;
a dimension in the length direction is about 0.400 mm±about 0.050 mm;
each of the plurality of dielectric layers has a thickness of about 0.48 μm±about 0.10 μm; and
a number of the plurality of dielectric layers is about 100 or more and about 500 or less.

9. The multilayer ceramic capacitor according to claim 1, wherein
a dimension in the laminating direction is about 0.250 mm±about 0.025 mm;
a dimension in the width direction is about 0.250 mm±about 0.025 mm;
a dimension in the length direction is about 0.500 mm±about 0.025 mm;
each of the plurality of dielectric layers has a thickness of about 0.48 μm±about 0.10 μm; and
a number of the plurality of dielectric layers is about 100 or more and about 500 or less.

10. The multilayer ceramic capacitor according to claim 1, wherein
a dimension in the laminating direction is about 0.500 mm±about 0.050 mm;
a dimension in the width direction is about 0.500 mm±about 0.050 mm;
a dimension in the length direction is about 0.800 mm±about 0.050 mm;
each of the plurality of dielectric layers has a thickness of about 0.48 μm±about 0.10 μm; and
a number of the plurality of dielectric layers is about 200 or more and about 1000 or less.

11. The multilayer ceramic capacitor according to claim 1, wherein
a dimension in the laminating direction is about 0.600 mm±about 0.050 mm;
a dimension in the width direction is about 0.450 mm±about 0.050 mm;
a dimension in the length direction is about 0.750 mm±about 0.050 mm;
each of the plurality of dielectric layers has a thickness of about 0.48 μm±about 0.10 μm; and
a number of the plurality of dielectric layers is about 200 or more and about 1000 or less.

12. The multilayer ceramic capacitor according to claim 1, wherein
a dimension in the laminating direction is about 0.500 mm±about 0.200 mm;
a dimension in the width direction is about 0.500 mm±about 0.200 mm;
a dimension in the length direction is about 1.000 mm±about 0.200 mm;
each of the plurality of dielectric layers has a thickness of about 0.48 μm±about 0.10 μm; and
a number of the plurality of dielectric layers is about 200 or more and about 1000 or less.

13. The multilayer ceramic capacitor according to claim 1, wherein each of the plurality of dielectric layers includes at least one of Ba, Ti, Dy, Mn, Si, V, Al, Zr and Ca.

14. The multilayer ceramic capacitor according to claim 13, wherein each of the plurality of dielectric layers includes about 0.2 parts by mol or more and about 0.5 parts by mol or less of Dy, relative to 100 parts by mol of Ti.

15. The multilayer ceramic capacitor according to claim 1, wherein
the first external electrode includes a first underlying electrode layer provided on the laminate and a first plating layer provided on a surface of the first underlying electrode layer; and
the second external electrode includes a second underlying electrode layer provided on the laminate and a second plating layer provided on a surface of the second underlying electrode layer.

16. The multilayer ceramic capacitor according to claim 1, wherein Ni—Mg—Mn—O glass is segregated in an end portion in the width direction of each of the plurality of first internal electrode layers and the plurality of second internal electrode layers.

17. A multilayer ceramic capacitor comprising:
a laminate having a rectangular or substantially rectangular parallelepiped shape and including a plurality of dielectric layers, a plurality of first internal electrode layers, a plurality of second internal electrode layers that are alternately laminated in a laminating direction, the laminate including a first principal surface and a second principal surface that are opposite to each other in the laminating direction, a first lateral surface and a second lateral surface that are opposite to each other in a width direction that is perpendicular or substantially perpendicular to the laminating direction, and a first end surface and a second end surface that are opposite to each other in a length direction that is perpendicular or substantially perpendicular to the laminating direction and the width direction;

a first external electrode that is electrically connected with the plurality of first internal electrode layers and provided on the first end surface; and a second external electrode that is electrically connected with the plurality of second internal electrode layers and provided on the second end surface; wherein the plurality of first internal electrode layers or the plurality of second internal electrode layers define a coverage area in a central portion in the width direction less than a coverage area within about 30.000 μm from an end portion of the first and second internal electrode layers in the width direction;

the plurality of first internal electrode layers or the plurality of second internal electrode layers define a shifting amount in the width direction of about 0.000 μm or more and about 10.000 μm or less;

Ni—Mg—Mn—O glass is segregated in an end portion in the width direction of each of the plurality of first internal electrode layers and the plurality of second internal electrode layers; and a dimension along the width direction of a region in which the Ni—Mg—Mn—O glass is segregated is about 1.000 μm or less.

18. A multilayer ceramic capacitor comprising:

a laminate having a rectangular or substantially rectangular parallelepiped shape and including a plurality of dielectric layers, a plurality of first internal electrode layers, a plurality of second internal electrode layers that are alternately laminated in a laminating direction, the laminate including a first principal surface and a second principal surface that are opposite to each other in the laminating direction, a first lateral surface and a second lateral surface that are opposite to each other in a width direction that is perpendicular or substantially perpendicular to the laminating direction, and a first end surface and a second end surface that are opposite to each other in a length direction that is perpendicular or substantially perpendicular to the laminating direction and the width direction;

a first external electrode that is electrically connected with the plurality of first internal electrode layers and provided on the first end surface; and a second external electrode that is electrically connected with the plurality of second internal electrode layers and provided on the second end surface; wherein the plurality of first internal electrode layers or the plurality of second internal electrode layers define a coverage area in a central portion in the width direction less than a coverage area within about 30.000 μm from an end portion of the first and second internal electrode layers in the width direction;

the plurality of first internal electrode layers or the plurality of second internal electrode layers define a shifting amount in the width direction of about 0.000 μm or more and about 10.000 μm or less;

the first external electrode includes a baked layer extending to a portion of each of the first principal surface and the second principal surface from the first end surface;

the second external electrode includes a baked layer extending to a portion of each of the first principal surface and the second principal surface from the second end surface;

each of the baked layer of the first external electrode and the baked layer of the second external electrode includes a protruding portion which protrudes in the laminating direction at a portion of the baked layer provided at least on the second principal surface side;

in the portion of the baked layer of the first external electrode provided at the second principal surface side:
when a first line connecting a leading end of the second end surface side and an apex of the protruding portion is defined, a point on a surface of the portion of the baked layer provided on the second principal surface side is located at a position at which a perpendicular or substantially perpendicular line drawn from the first line to the surface of the portion of the baked layer provided on the second principal surface side to cross the first line at right angles is longest; and a dimension along the laminating direction between the point on the surface of the portion of the baked layer provided on the second principal surface side and the apex of the protruding portion is about 0.5 μm or more and about 35 μm or less;

in the portion of the baked layer of the second external electrode provided on the second principal surface side:
when a second line connecting a leading end of the first end surface side and the apex of the protruding portion is defined, a point on a surface of the portion of the baked layer provided on the second principal surface side is located at a position at which a perpendicular or substantially perpendicular line drawn from the second line to the surface of the portion of the baked layer provided on the second principal surface side to cross the second line at right angles is the longest; and a dimension along the laminating direction between the point on the surface of the portion of the baked layer provided on the second principal surface side and the apex of the protruding portion is about 0.5 μm or more and about 35 μm or less; and a dimension along the laminating direction of the multilayer ceramic capacitor is about 0.18 mm or more and about 0.70 mm or less.

19. A multilayer ceramic capacitor comprising:

a laminate having a rectangular or substantially rectangular parallelepiped shape and including a plurality of dielectric layers, a plurality of first internal electrode layers, a plurality of second internal electrode layers that are alternately laminated in a laminating direction, the laminate including a first principal surface and a second principal surface that are opposite to each other in the laminating direction, a first lateral surface and a second lateral surface that are opposite to each other in a width direction that is perpendicular or substantially perpendicular to the laminating direction, and a first end surface and a second end surface that are opposite to each other in a length direction that is perpendicular or substantially perpendicular to the laminating direction and the width direction;

a first external electrode that is electrically connected with the plurality of first internal electrode layers and provided on the first end surface; and a second external electrode that is electrically connected with the plurality of second internal electrode layers and provided on the second end surface; wherein the plurality of first internal electrode layers or the plurality of second internal electrode layers define a coverage area in a central portion in the width direction less than a coverage area within about 30.000 μm from an end portion of the first and second internal electrode layers in the width direction;

the plurality of first internal electrode layers or the plurality of second internal electrode layers define a shifting amount in the width direction of about 0.000 μm or more and about 10.000 μm or less;

the first external electrode includes a baked layer extending to a portion of each of the first principal surface and the second principal surface from the first end surface;

the second external electrode includes a baked layer extending to a portion of each of the first principal surface and the second principal surface from the second end surface;

in a surface of a portion of the baked layer of the first external electrode provided on the second principal surface side:
- a dimension along the surface of the first external electrode from a leading end of the second end surface side to the first end surface is defined as $d_1$, a dimension along the length direction from the leading end of the second end surface side to the first end surface is defined as $e_1$, and $d_1/e_1$ is about 1.0045 or more and about 1.4 or less; and in a surface of a portion of the baked layer of the second external electrode provided on the second principal surface side:
- a dimension along the surface of the second external electrode from a leading end of the first end surface side to the second end surface is defined as $d_2$, dimension along the length direction from the leading end of the first end surface side to the second end surface is defined as $e_2$, and $d_2/e_2$ is about 1.0045 or more and about 1.4 or less.

* * * * *